(12) United States Patent  (10) Patent No.: US 8,327,961 B2
Arpino  (45) Date of Patent: Dec. 11, 2012

(54) WALK-WITH APPARATUS

(76) Inventor: Mario Peter Arpino, Pinner (GB)

( * ) Notice: Subject to any disclaimer, the term of this patent is extended or adjusted under 35 U.S.C. 154(b) by 202 days.

(21) Appl. No.: 12/312,343

(22) PCT Filed: Nov. 7, 2007

(86) PCT No.: PCT/GB2007/004249
§ 371 (c)(1),
(2), (4) Date: May 6, 2009

(87) PCT Pub. No.: WO2008/056142
PCT Pub. Date: May 15, 2008

(65) Prior Publication Data
US 2010/0025124 A1  Feb. 4, 2010

(30) Foreign Application Priority Data
Nov. 7, 2006 (GB) .................................. 0622148.5

(51) Int. Cl.
*B62D 51/04* (2006.01)
(52) U.S. Cl. ...................... 180/19.1; 180/19.2; 180/19.3; 280/DIG. 5
(58) Field of Classification Search .................. 180/19.1, 180/19.2, 19.3, DIG. 5
See application file for complete search history.

(56) References Cited

U.S. PATENT DOCUMENTS

| | | | |
|---|---|---|---|
| 2,937,706 A | 5/1960 | Chandler | |
| 4,063,612 A * | 12/1977 | Weiss | 180/19.2 |
| 5,125,468 A * | 6/1992 | Coker | 180/13 |
| 5,540,296 A * | 7/1996 | Strothmann | 180/19.3 |
| 5,657,828 A * | 8/1997 | Nagamachi | 180/19.3 |
| 6,227,320 B1 * | 5/2001 | Eggert et al. | 180/19.2 |

FOREIGN PATENT DOCUMENTS

| | | |
|---|---|---|
| GB | 2 008 065 | 5/1979 |
| GB | 2 375 745 | 11/2002 |
| GB | 2 426 963 | 12/2006 |
| WO | WO 97/36763 | 10/1997 |

OTHER PUBLICATIONS

International Search Report.
British Search Report.

* cited by examiner

*Primary Examiner* — Lesley D Morris
*Assistant Examiner* — Marlon Arce
(74) *Attorney, Agent, or Firm* — Collard & Roe, P.C.

(57) ABSTRACT

Walk-with apparatus (101), e.g. a powered golf-caddy (101), has a reference member (18), a handle (1) adapted to be used to hold and guide the apparatus, and rotary mechanical damping means (13, 14), the handle 1 being movable in a forwards and backwards direction (103) relative to the reference member (18) to produce electric signals (104) to vary the speed of the (apparatus 101), under the effect of the damping means (13, 14) thereby to inhibit hunting. In addition to spring means (6, 8) and a DC motor controller (110) with an acceleration ramp, the damping means (13, 14) is needed to give smooth motion. The handle (1) has rotary cam means (80, 81, 90) to lock it in any position along direction (103), with a 45° rotation either way at any angle. The handle (1) has a fold-flat articulation means (21a, 23a, 84-88) comprising two interengaging cogged parts (21a, 23a), each having a pivot (87), one part (23) a for handle l and the other part (21a) for a support member (21) (on the main part of caddy (101)) for handle (1), and a tie (84, 84) tying the two pivots (87, 87) together. The handle (1) can swivel sideways (under rotary mechanical damping means (200a, 210, 210a)) to steer the caddy (101), with a potentiometer (207) to generate electric steering signals (104), e.g. to operate differentially the caddy's wheels (101a, 101b) for steering.

22 Claims, 17 Drawing Sheets

Figure 2:
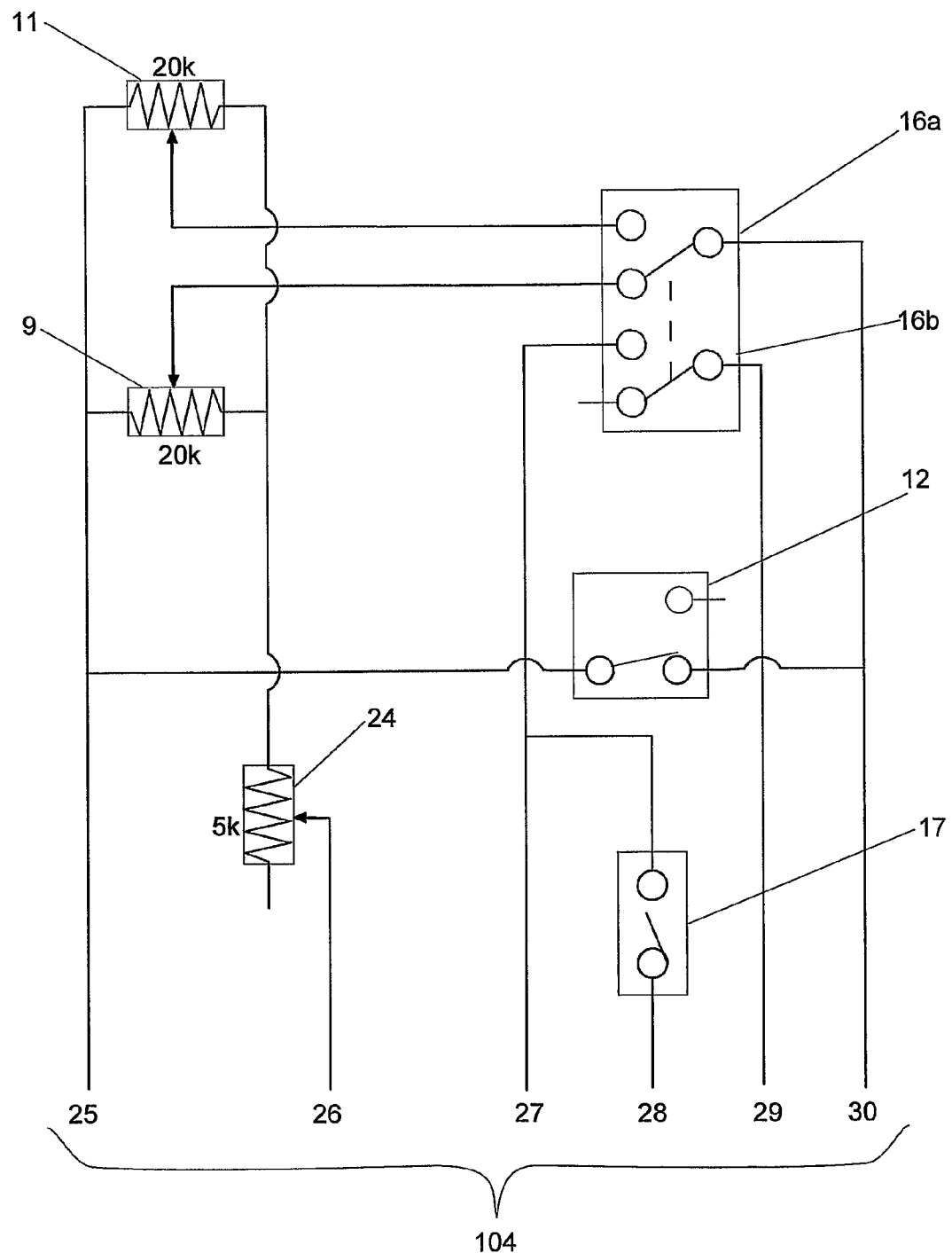

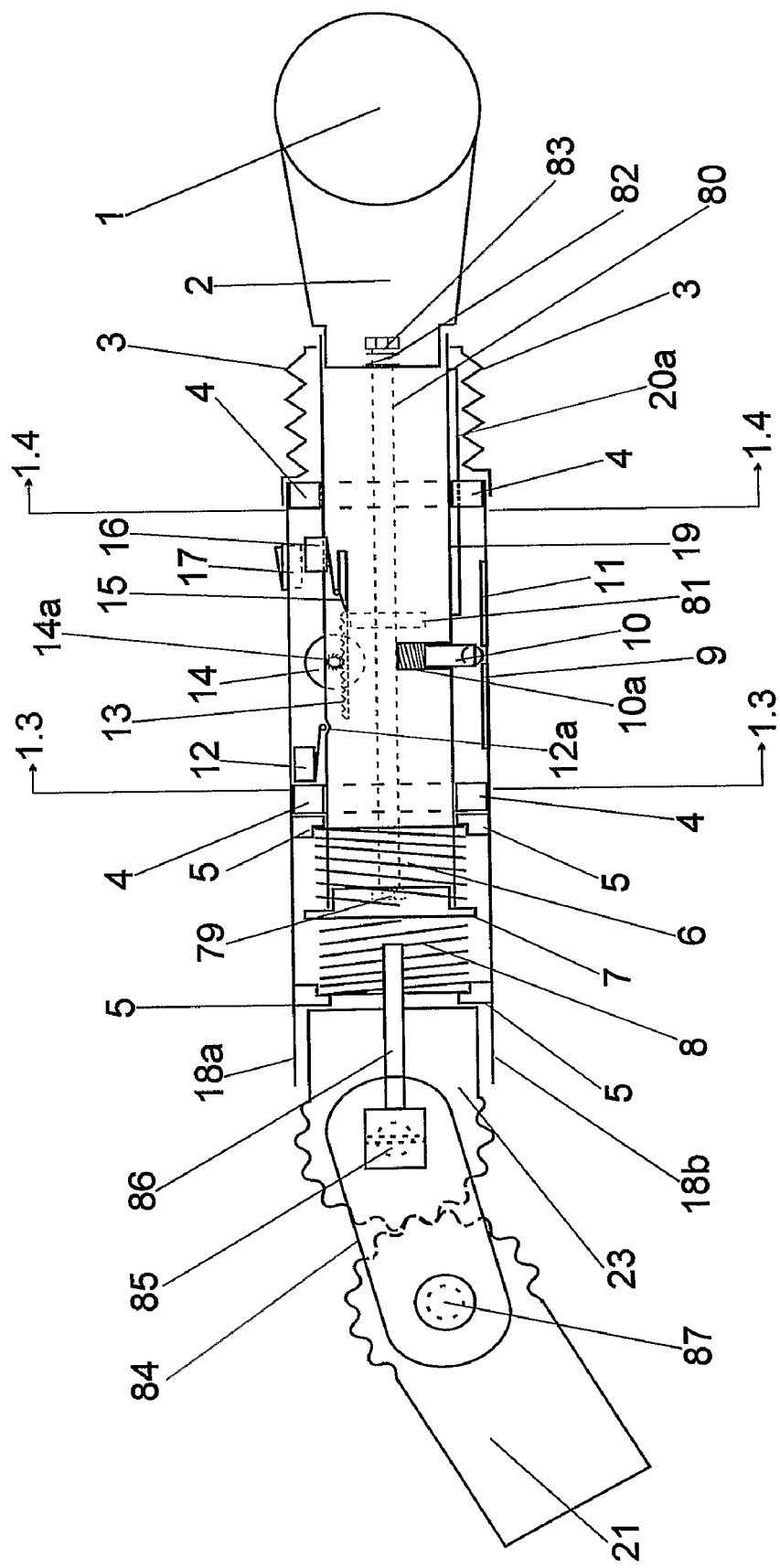
Figure 1.1

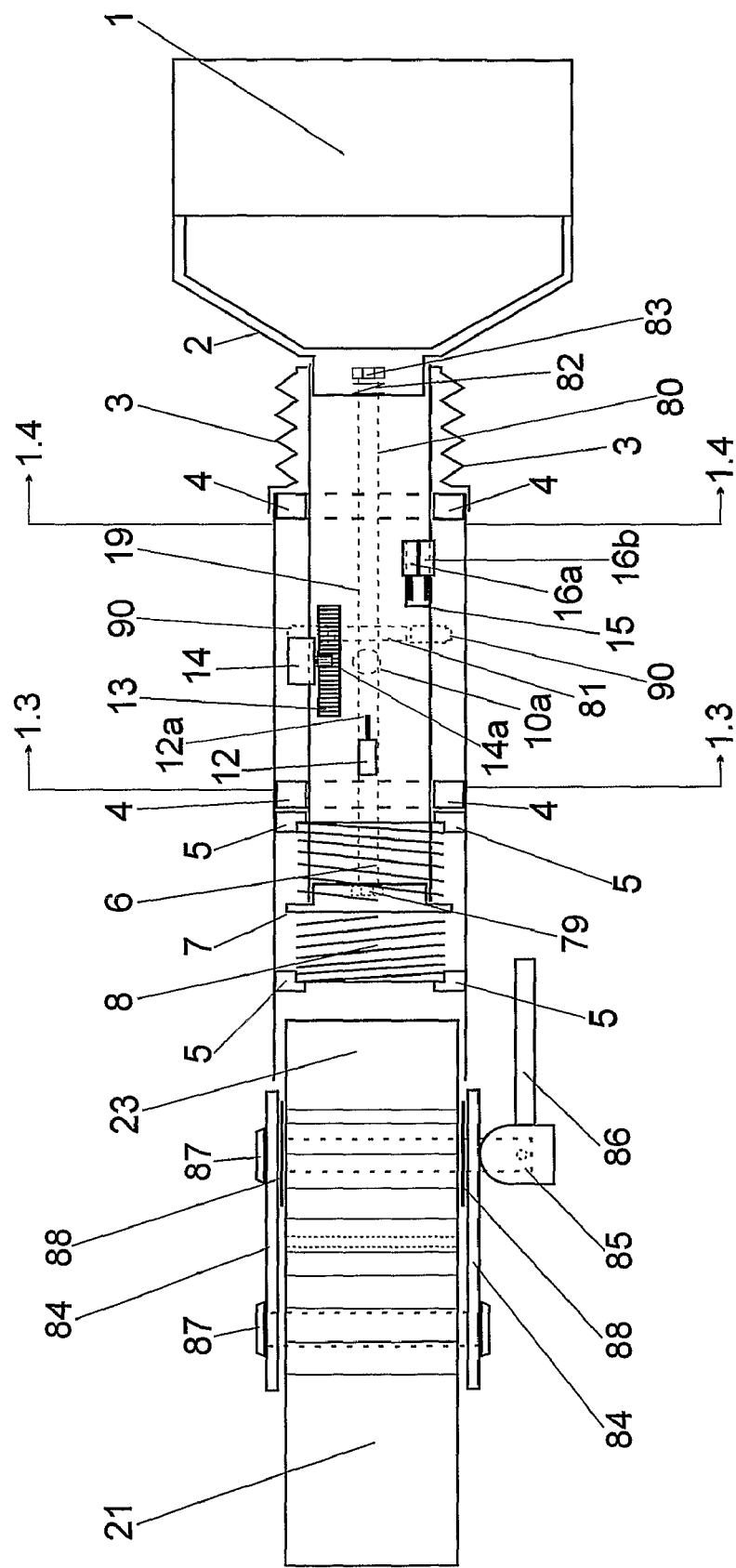
Figure 1.2

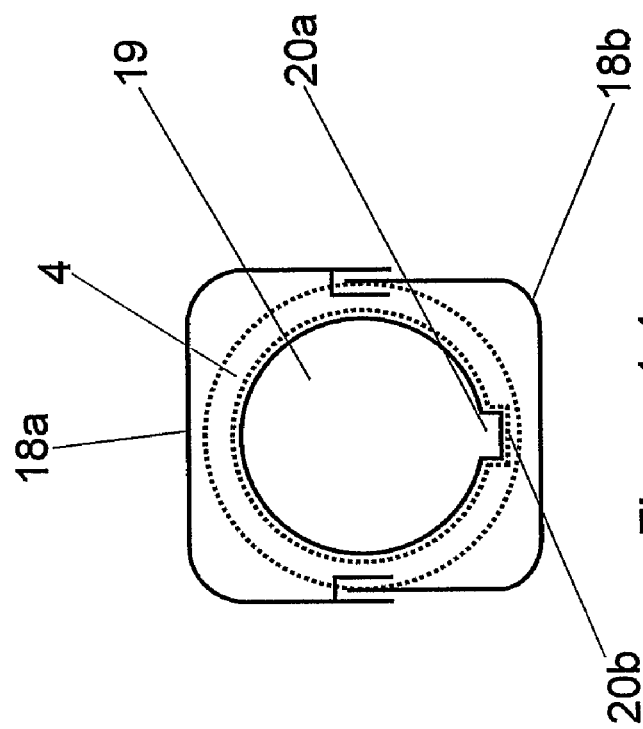
Figure 1.4
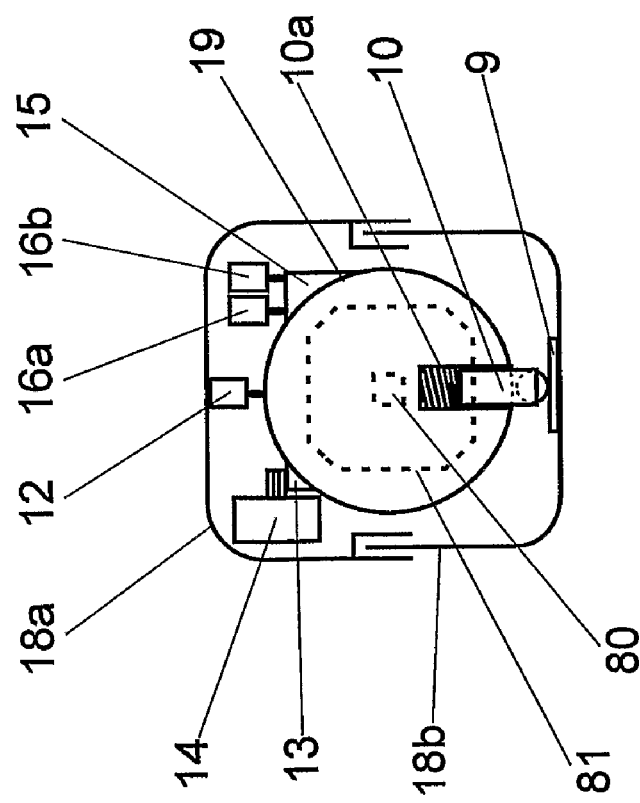
Figure 1.3

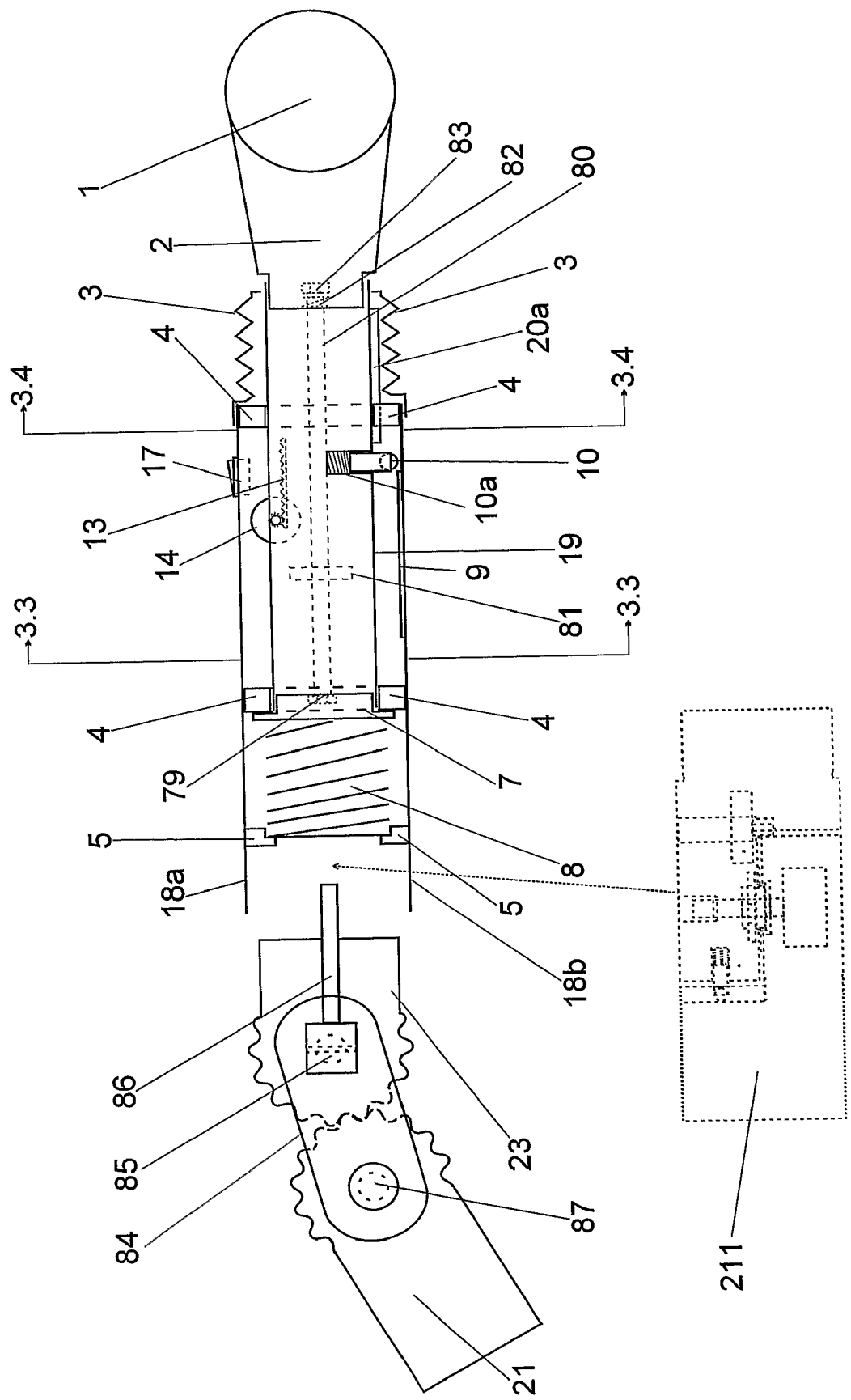
Figure 3.1

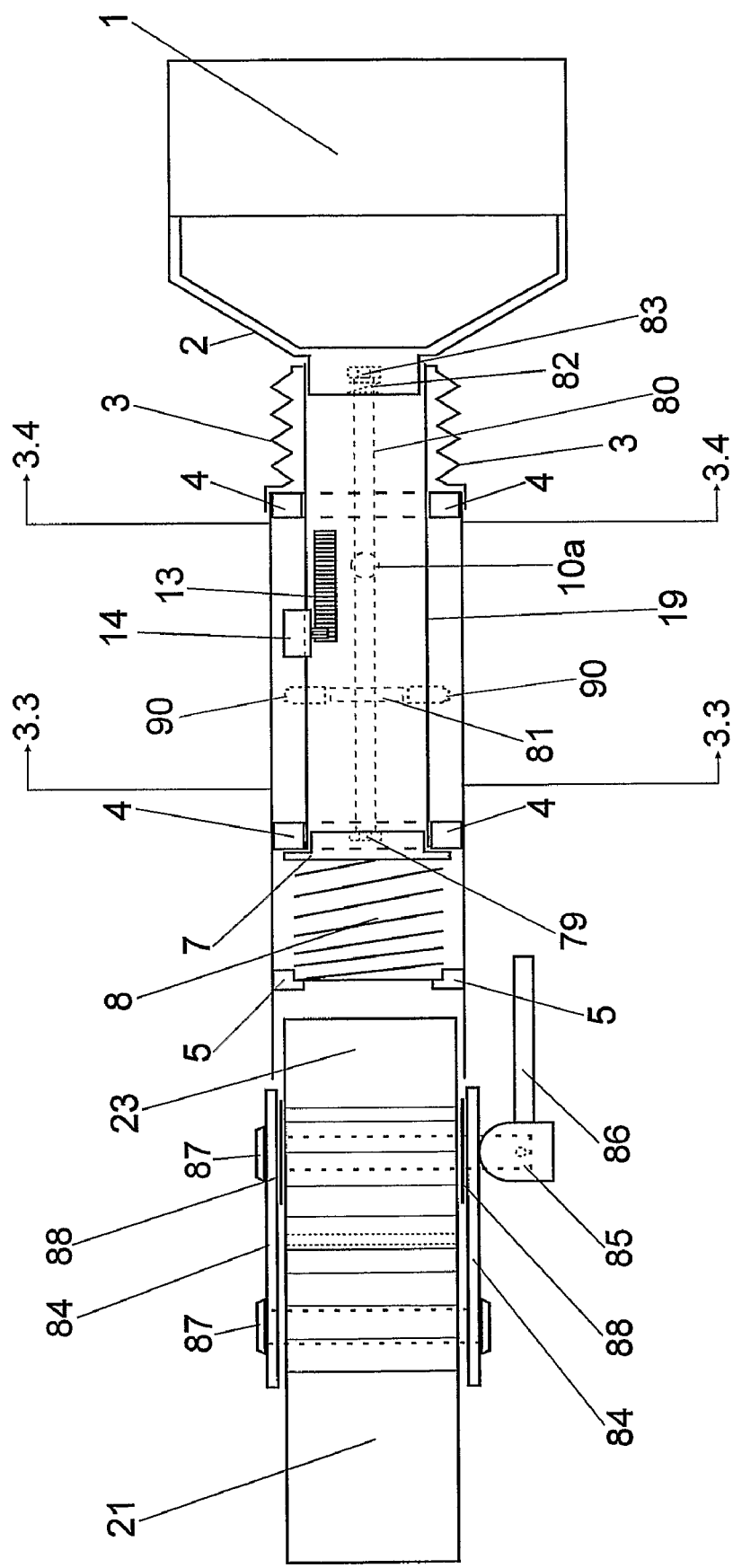
Figure 3.2

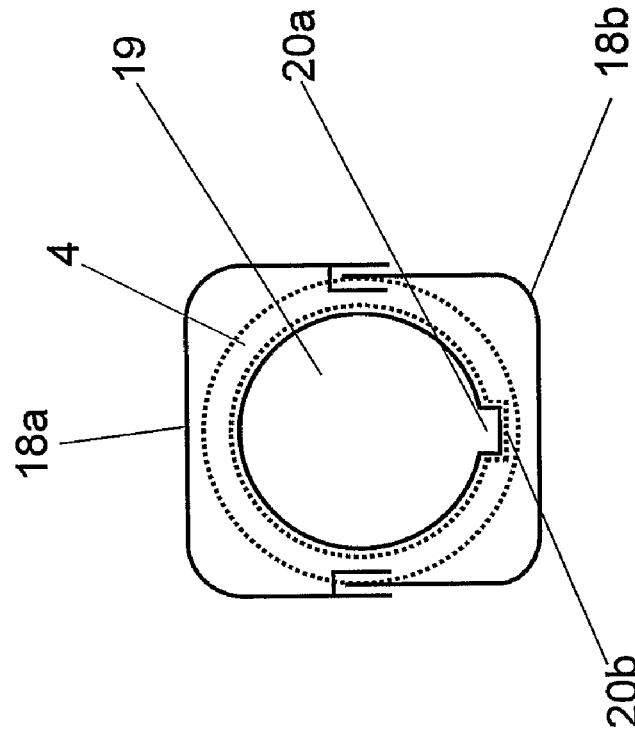
Figure 3.4
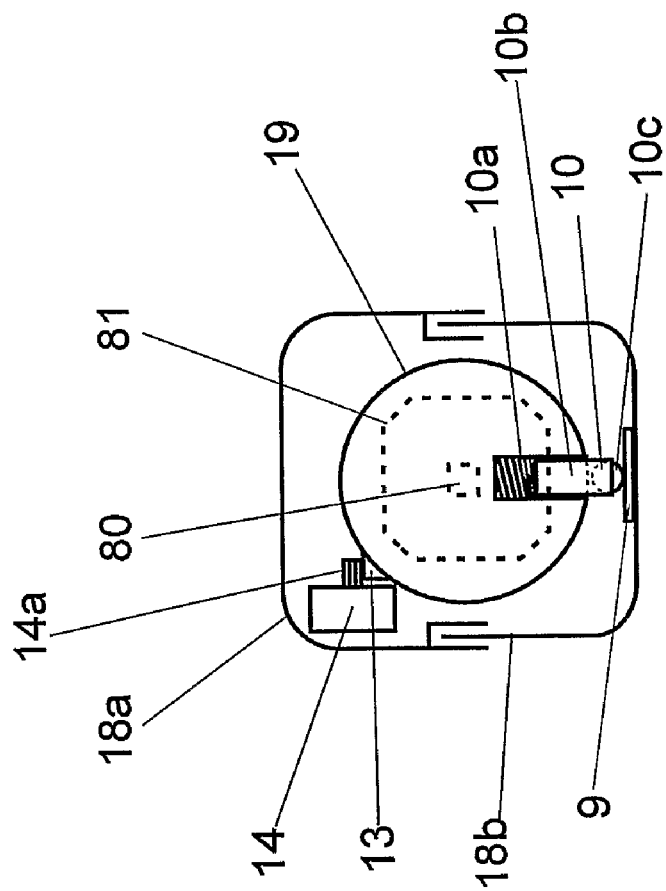
Figure 3.3

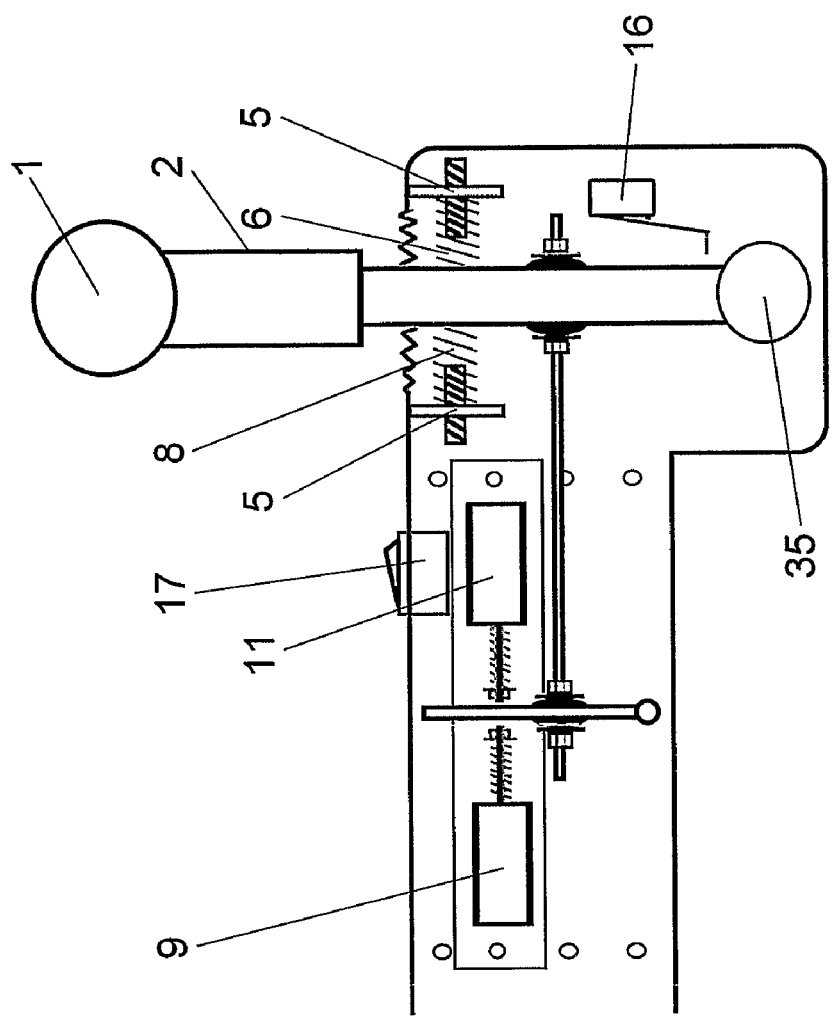
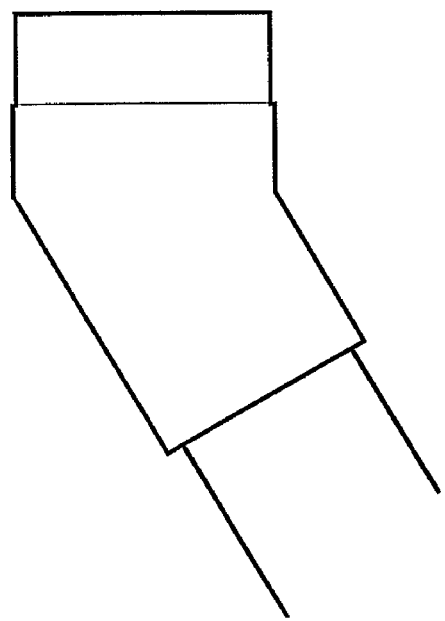
Figure 5

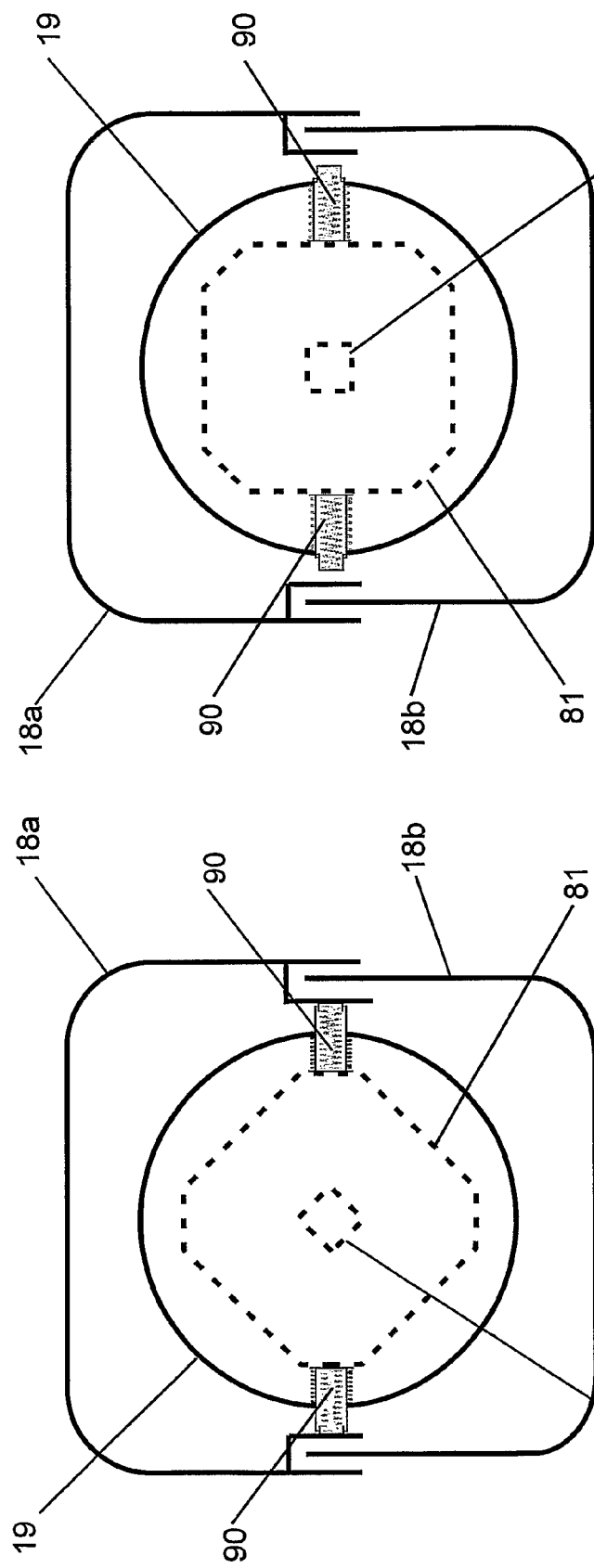
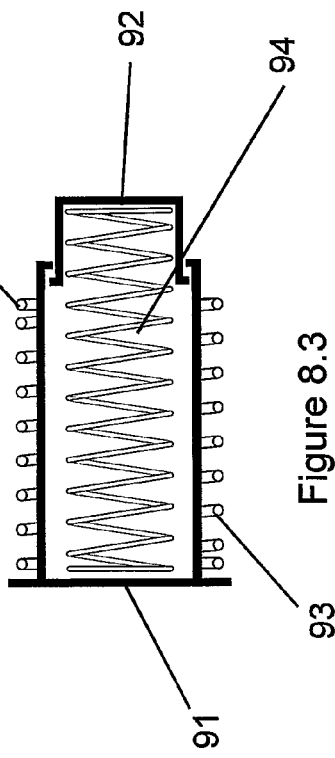
Figure 8.1
Figure 8.2
Figure 8.3

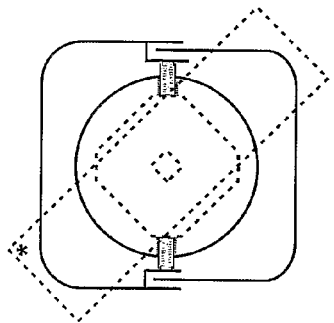
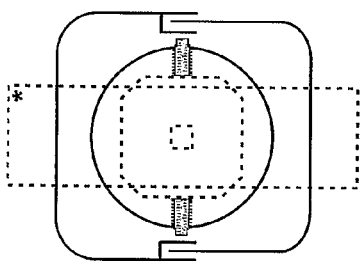
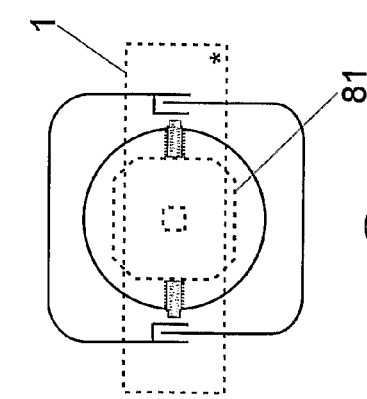
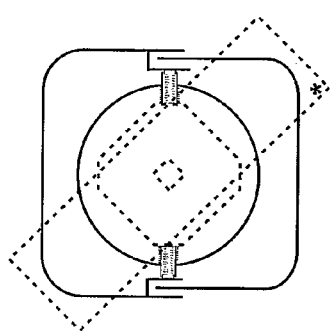
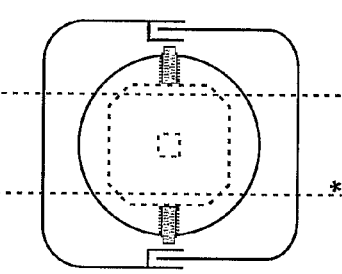
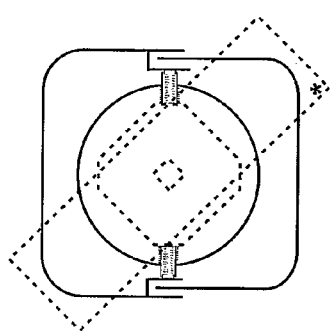
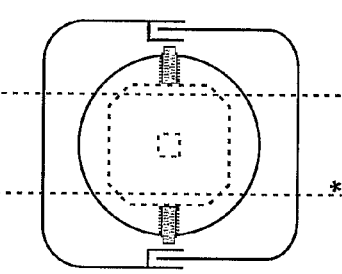
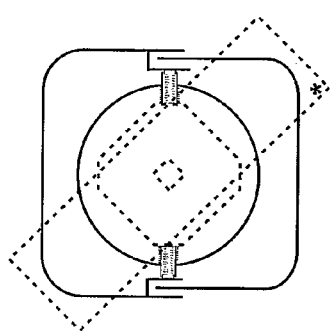
Figure 9.1 (0°)
Figure 9.2 (45°)
Figure 9.3 (90°)
Figure 9.4 (135°)
Figure 9.5 (180°)
Figure 9.6 (225°)
Figure 9.7 (270°)
Figure 9.8 (315°)

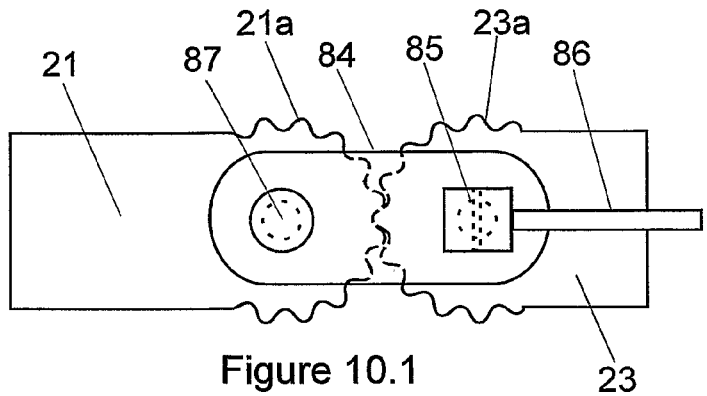
Figure 10.1
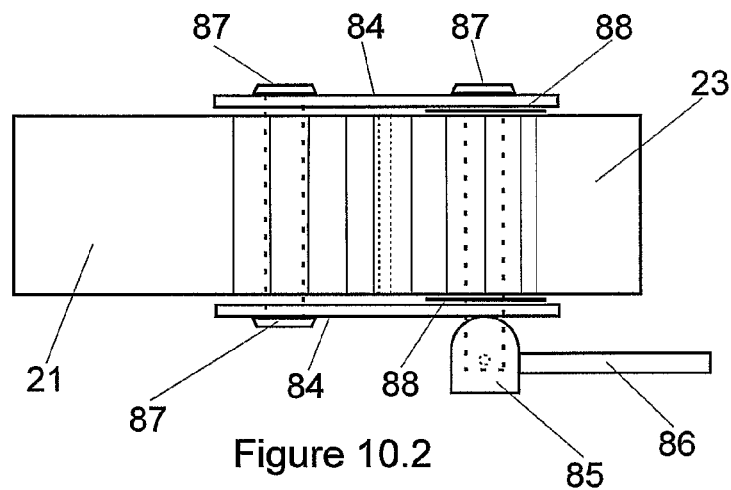
Figure 10.2
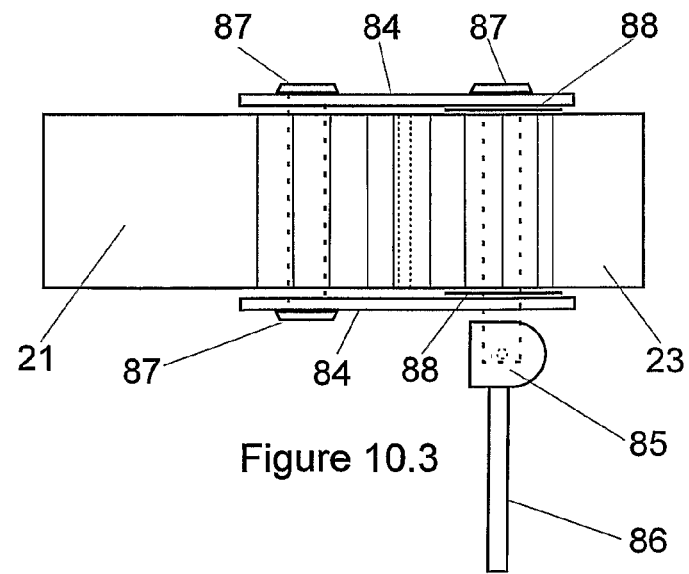
Figure 10.3

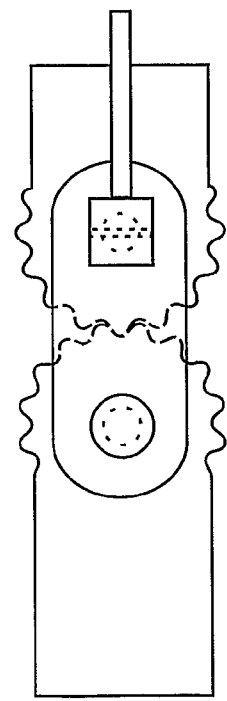
Figure 11.1
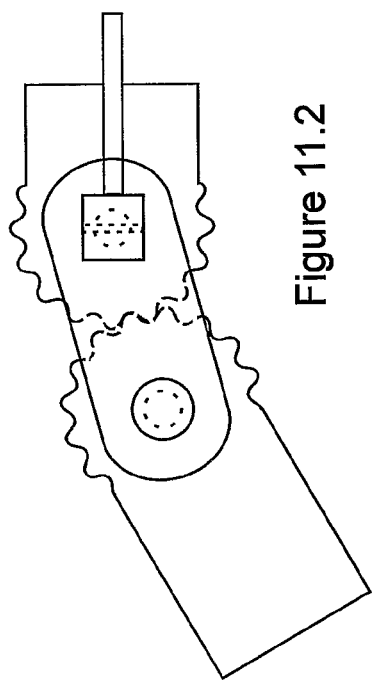
Figure 11.2
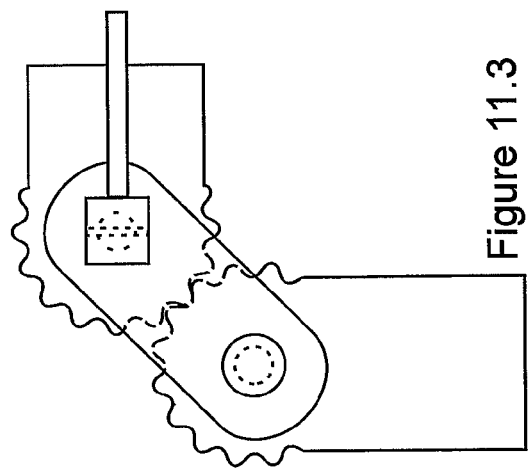
Figure 11.3
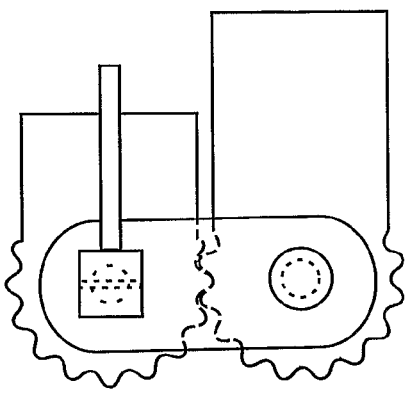
Figure 11.4

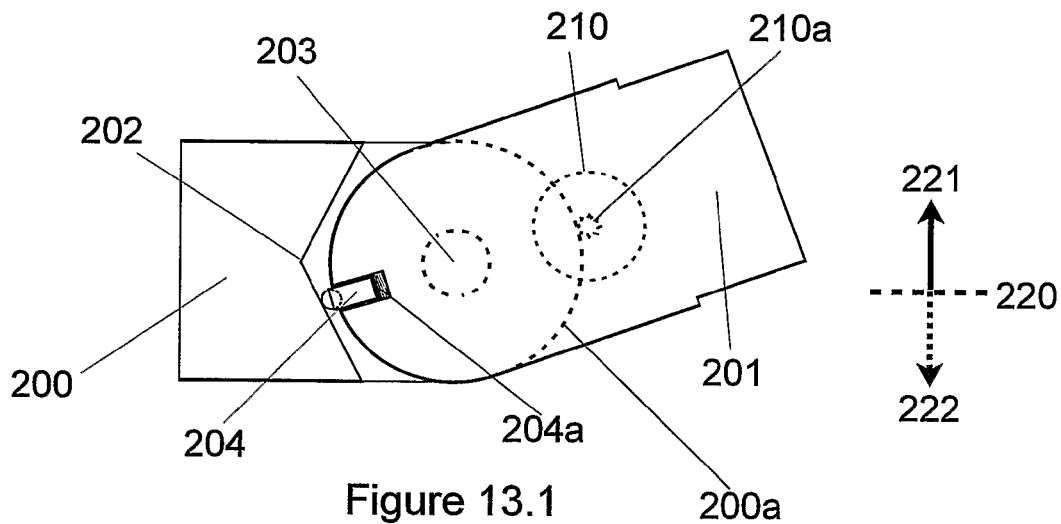
Figure 13.1
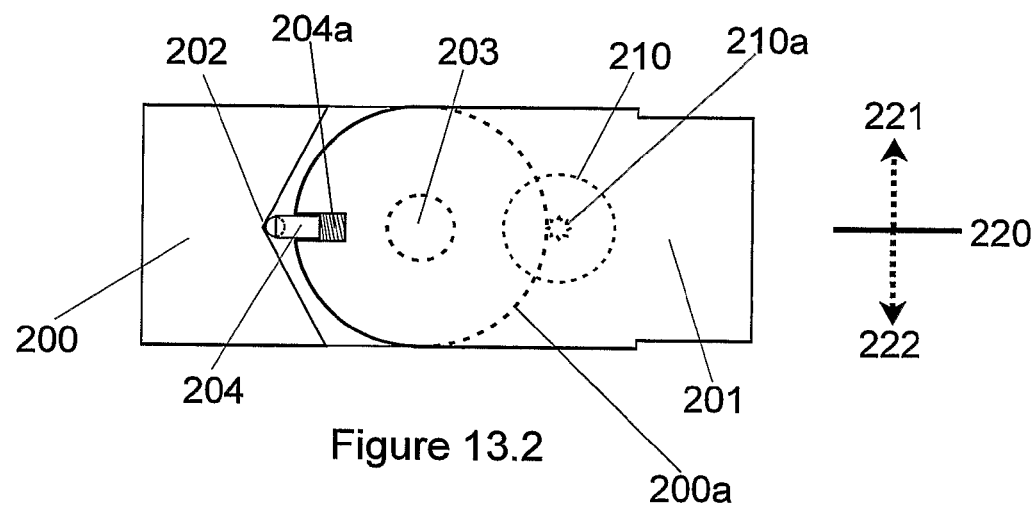
Figure 13.2
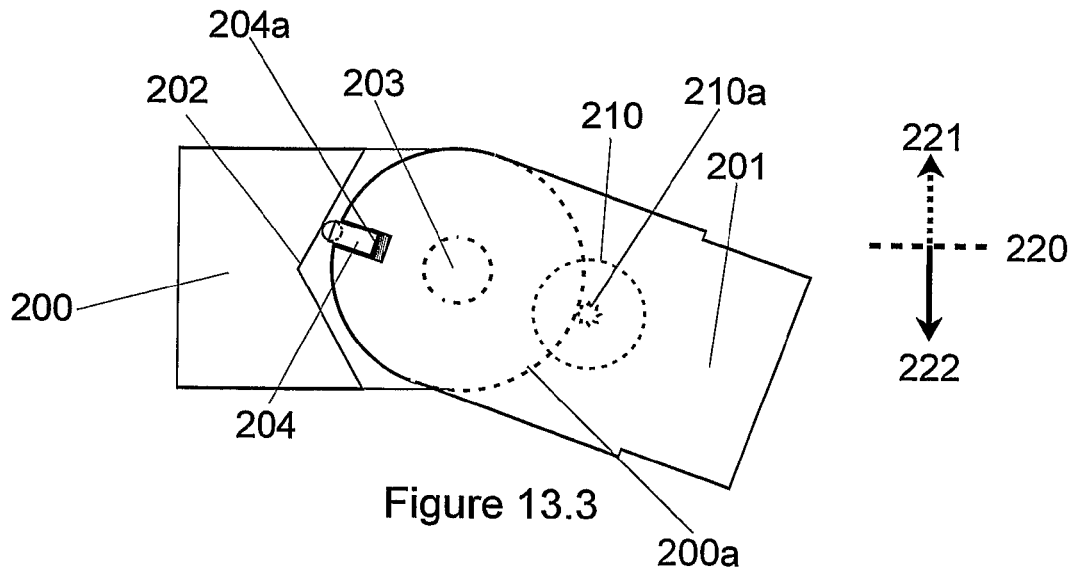
Figure 13.3

WALK-WITH APPARATUS

CROSS REFERENCE TO RELATED APPLICATIONS

Applicant claims priority under 35 U.S.C. §119 of British Application No. 0622148.5 filed Nov. 7, 2006. Applicant also claims priority under 35 U.S.C. §365 of PCT/GB2007/004249 filed Nov. 7, 2007. The international application under PCT article 21(2) was published in English.

FIELD OF THE INVENTION

This invention relates to walk-with apparatus and speed-control means therefor.

BACKGROUND

Existing walk-with golf caddies have very poor speed control handles.

THE INVENTION

One aspect of the invention provides walk-with apparatus having a reference member, a handle adapted to be used to hold and guide the apparatus, and a damper, the handle being movable in a forwards and backwards direction relative to the reference member to produce electric signals to vary the speed of the apparatus, under the effect of the damper thereby to inhibit (i.e. reduce or prevent) hunting.

Another aspect of the invention provides speed-control means adapted to be used by a person walking with walk-with apparatus to vary the speed of the apparatus, the means having a reference member, a handle adapted to be used to hold and guide the apparatus, and a damper, the handle being movable in a forwards and backwards direction relative to the reference member to produce electric signals suitable to vary the speed of such apparatus, under the effect of the damper thereby to inhibit hunting.

Another aspect of the invention provides a method of adjusting any such apparatus or means, comprising a damper and a DC motor with an acceleration ramp, in which method the damper and acceleration ramp are adjusted in combination to control how the speed responds to operation of the handle.

Another aspect of the invention provides a method of operating any such apparatus or means comprising a handle, in which the handle is operated to control the speed of the apparatus to match the speed of an operator walking with the apparatus with inhibited hunting.

Another aspect of the invention provides control means having a reference member, a handle movable in a forwards and backwards direction relative to the reference member to produce electric control signals, e.g. according to its position, and means for locking the handle in a chosen position in said forwards and backwards direction.

Another aspect of the invention provides walk-with apparatus having a reference member, a handle adapted to be used to hold and guide the apparatus, the handle being movable in a forwards and backwards direction relative to the reference member to produce electric signals to vary the speed of the apparatus, and means for locking the handle in a chosen position in said forwards and backwards direction.

Another aspect of the invention provides control means having a unit comprising a reference member and a handle movable in a forwards and backwards direction relative to the reference member to produce electric control signals, e.g. according to its position, a support member for the unit, and articulation means to enable the unit's attitude relative to the support member to be changed.

Another aspect of the invention provides walk-with apparatus having a unit comprising a reference member and a handle adapted to be used to hold and guide the apparatus, the handle being movable in a forwards and backwards direction relative to the reference member to produce electric signals to vary the speed of the apparatus, a support member for the unit, and articulation means to enable the unit's attitude relative to the support member to be changed.

Another aspect of the invention provides speed-control means Speed-control means adapted to be used by a person walking with walk-with apparatus to vary the speed of the apparatus, the means having a reference member and a handle adapted to be used to hold and guide the apparatus and movable in a sideways direction relative to the reference member to produce electric signals suitable to vary the direction of motion of such apparatus for steering the same, and being movable in a different direction relative to the reference member to produce electric signals suitable to vary the speed of such apparatus.

Another aspect of the invention provides walk-with apparatus having a reference member and a handle adapted to be used to hold and guide the apparatus and movable in a sideways direction relative to the reference member to produce electric signals suitable to vary the direction of motion of such apparatus for steering the same, and being movable in a different direction relative to the reference member to produce electric signals suitable to vary the speed of such apparatus.

Another aspect of the invention provides speed-control means for a walk-with vehicle or other walk-with apparatus, said means comprising a handle, a reference member relative to which the handle has a forward range of movement in which it can move in a forward direction to control increase in forward speed of the apparatus and incrementally backwards to control reduction in the forward speed, and means to convert positions of the handle into electric signals to control the speed. This may be termed "an intuitive movement handle" since a forward movement of the handle causes increase in forward speed of the apparatus and an incremental backwards movement of the handle from any particular forward speed position causes a reduction in forwards speed. Said speed-control means are adapted for mechanical connection to said apparatus.

The term "positions" is to be understood in its widest sense, and, for example, covers microscopic movements that might be all that is needed to apply different pressures to pressure-sensors to produce said electric signals to increase or reduce forward speed, or again quasi-positions of the handle obtained by sensing only movements of the handle and performing an integration on these to assess quasi-position values corresponding to positions of the handle. Such speed-control means are distinct from, for example, a joystick control for a passenger-controlled wheelchair because e.g. control movements of the joystick have to be too fine for such a control to be useable by a person walking alongside the wheelchair.

Another aspect of the invention provides a walk-with vehicle or other walk-with apparatus comprising speed-control means, said means comprising a handle, a reference member relative to which the handle has a forward range of movement in which it can move in a forward direction to control increase in forward speed of the apparatus and incrementally backwards to control reduction in the forward speed, and means to convert the position of the handle into an electric signal to control the speed.

Any such apparatus, means or method has or may have any of the following features:

the handle has a forward range of movement in which it can move forwards to control increase in forward speed of the apparatus and incrementally backwards to control reduction in the forward speed.

the handle has a zero position, e.g. at one end of said range, corresponding to zero speed.

the handle has a backwards range of movement in which it can move in a backwards direction to control increase in backwards speed of the apparatus and incrementally forwards to control reduction in the backwards speed.

the forward range, zero position and backwards range allow a smooth transition of the electric signal from a forward-controlling signal to a backward-controlling signal.

adapted to match the speed of the apparatus smoothly to the walking pace of an operator walking with said apparatus.

in which the handle is connected and arranged to transmit thrust to the reference member without torque when moved in said forwards and backwards direction.

in which the handle is adapted to have rectilinear movement in said direction.

in which the handle is connected in-line with a (possibly piston-like, i.e. stiff, massive and/or substantially cylindrical) reciprocable member arranged to move within said reference member.

in which the handle is adapted to have sideways movement to enable control of the direction of movement of said apparatus (i.e. steering).

the damping means serve to slow down or smooth out transmission of forces applied to the handle to change speed of the apparatus.

said damping means comprise rotary damping means.

the damping means are connected between the handle and reference member.

the inhibiting means comprise a DC motor controller adapted to provide an acceleration ramp for the motor.

in which the damping means and the acceleration ramp controller are capable of adjustment in combination to enable the speed of travel of the apparatus to be regulated to match the speed of an operator walking with the apparatus simply by the operator holding the handle, smoothly and so as to inhibit hunting.

comprising linear position sensor means to produce said signals from movement of said handle.

comprising continuous position sensor means to produce said signals from movement of said handle.

comprising contactless position sensor means to produce said signals from movement of said handle.

in which said contactless position sensor means comprise capacitive means to produce said signals from movement of said handle.

in which said contactless position sensor means comprise inductive means to produce said signals from movement of said handle.

comprising potentiometer means to produce said signals from movement of said handle.

in which the potentiometer means comprise linear potentiometer means.

the potentiometer means comprise indirect-pressure potentiometer means as hereinbefore defined (e.g. potentiometer means known under the trade name SOFTPOT) to produce said signals from movement of said handle.

comprising speed-control means for the apparatus which comprise means to produce said electric signals from movements of said handle, the speed-control means having been, or being adapted to be, retrofitted to the apparatus.

comprising a DC motor adapted to act as a brake under predetermined conditions relating to said electric signals.

comprising a dead man's handle mechanism (i.e. that will operate to bring the apparatus to a halt if the operator releases the handle, e.g. by the handle being adapted to return then to a zero-speed position, e.g. at which there is utilised a braking effect of the motor if the motor and controller are suitably equipped to do this).

comprising a vehicle.

said vehicle is a golf-caddy.

comprising means for locking the handle in a chosen position in said forwards and backwards direction.

in which said position is infinitely variable.

in which said locking means comprise means to engage and lock the handle with said reference member.

in which said locking means are operable by rotation of the handle (e.g. 360 degrees, e.g. suitable for left-handed (LH) and right-handed (RH) persons).

in which said locking means are operable by rotation of the handle about an axis in said forwards and backwards direction.

in which said locking means comprise cam means rotatable about said axis by the handle.

in which said locking means comprise cam follower means adapted to engage and lock with said reference member.

having a unit comprising said reference member and said handle, a support member for the unit, and articulation means to enable the unit's attitude relative to the support member to be changed.

in which the articulation means are adapted to enable the unit's attitude to be changed to multiple positions.

in which the articulation means are adapted to enable the unit's attitude to be changed to infinitely variable positions.

in which the articulation means are adapted to enable the unit to fold flat against the support member.

in which the articulation means are adapted to enable the unit to fold flat in two opposite directions.

in which the articulation means comprise two interengaging cogged parts, each having a pivot, one said part for said unit and the other said part for said support member, and a tie tying the two pivots together.

comprising locking means to lock the unit at a chosen said attitude.

comprising locking means to lock the unit at a chosen said attitude by locking a said pivot.

in which the locking means comprise a friction part, and a lever and cam operable to engage together the tie and locking pivot by means of the friction part.

which comprises electrically operated and/or electrically controlled steering means to steer the apparatus.

in which said handle is movable in a sideways direction relative to the reference member to produce electric signals suitable to vary the direction of motion of such apparatus for steering the same.

comprising damping means to control the sideways movement of the handle.

in which the handle has a middle position (e.g. a defined middle position) for steering straight ahead.

in which there are means (e.g. a notch and cooperating catch) to help an operator locate the handle in said middle position and/or to hold the handle in such position unless deliberately moved sideways from it.

in which there are means to bias the handle towards said middle position (e.g. to act as a dead man's handle).

comprising wheels operable differentially to steer the apparatus.

comprising electric motor means connected to drive respective said wheels differentially to steer the apparatus (e.g. a separate motor for each wheel).

comprising feedback means to sense the speed differential between said wheels or means driving them and control such driving means to cause said speed differential to tend to zero when said handle is in said middle position.

adapted for a person walking with the apparatus to control the speed of the apparatus solely by moving the handle. He might need to hold some other part of the apparatus with his other hand.

alternatively, adapted for a person walking with the apparatus to hold and move only the handle, and not hold, contact, or transmit force to or otherwise control any other part of the apparatus, and thereby control the speed of the apparatus. For example, it may be sturdy enough for him to hold the apparatus simply and only by the handle.

adapted for a person walking with the apparatus to vary the direction of movement of the apparatus solely by moving the handle. For this purpose, the handle may be mounted to a swivel arm, e.g. to alter the direction of guide wheel means. Or again, it may be fixedly mounted to the apparatus, other than in the speed-controlling direction, e.g. so that the handle can be used to move the apparatus bodily into a new direction.

adapted for a person walking with the apparatus to control the speed of the apparatus and vary the direction of movement of the apparatus solely by moving the handle, i.e. both of them by movement of the handle.

if, for example, the handle is made sturdy enough and otherwise suitably designed, the speed-control means may be adapted for a person walking with the apparatus to be able to move the apparatus in order to make it travel, i.e. to push or pull the apparatus, solely by means of the handle, i.e. in the absence of self-propelled motive force for the apparatus, e.g. if self-propelled motive means for the apparatus fail. Thus, the speed-control means for this purpose may need to have a sturdy or robust type of construction, e.g. not a joystick type but a linear movement (e.g. slider) type.

in which the handle has a forward range of movement in which it can move forwards to control increase in forward speed of the apparatus and incrementally backwards to control reduction in the forward speed.

in which the handle has a zero position corresponding to zero speed.

in which the handle has a backwards range of movement in which it can move in a backwards direction to control increase in backwards speed of the apparatus and incrementally forwards to control reduction in the backwards speed.

in which the forward range, zero position and backwards range allow a smooth transition of the electric signal from a forward-controlling signal to a backward-controlling signal.

adapted to match the speed of the apparatus smoothly to the walking pace of an operator walking with said apparatus.

in which the handle is connected and arranged to transmit thrust to the reference member without torque when moved in said forwards and backwards direction.

in which the handle is adapted to have rectilinear movement in said direction.

in which the handle is connected in-line with a reciprocable member arranged to move within said reference member.

in which the handle is adapted to have sideways movement to enable control of the direction of movement of said apparatus.

in which said damping means comprise rotary damping means.

in which the damping means are connected between the handle and reference member.

comprising an electric motor to produce travel movement forwards, and possibly backwards, of said apparatus, and controlled by said electric signal to control said speed of this movement the motor is a DC motor.

comprising a motor controller for the motor which has an acceleration ramp (the deliberate substantial time the controller takes to bring the motor up to the speed set for the controller, i.e. as set by said electric signal) to provide smooth acceleration.

comprising a DC motor controller adapted to provide an acceleration ramp for the motor.

in which the damping means and the acceleration ramp controller are adapted for adjustment in combination to enable the speed of travel of the apparatus to be regulated to match the speed of an operator walking with the apparatus simply by the operator holding the handle, smoothly and so as to inhibit hunting.

the acceleration ramp is greater than 0.25 second.

the acceleration ramp is in a range of from 0.5 to 1.5 seconds.

comprising linear position sensor means to produce said signals from movement of said handle.

comprising continuous position sensor means to produce said signals from movement of said handle.

comprising contactless position sensor means to produce said signals from movement of said handle.

in which said contactless position sensor means comprise capacitive means to produce said signals from movement of said handle.

in which said contactless position sensor means comprise inductive means to produce said signals from movement of said handle.

comprising potentiometer means to produce said signals from movement of said handle.

in which the potentiometer means comprise indirect-pressure potentiometer means as hereinbefore defined to produce said signals from movement of said handle (e.g. potentiometer means known under the trade name SOFTPOT).

comprising speed-control means for the apparatus which comprise means to produce said electric signals from movements of said handle, the speed-control means having been, or being adapted to be, retrofitted to the apparatus.

comprising a DC motor adapted to act as a brake under predetermined conditions relating to said electric signals.

comprising a dead man's handle mechanism (i.e. that will operate to bring the apparatus to a halt if the operator releases the handle, e.g. by the handle being adapted to return to a zero-speed position, e.g. using a braking effect of the motor).

comprising a vehicle.

in which said vehicle is a golf-caddy.

comprising means for locking the handle in a chosen position in said forwards and backwards direction.

in which said position is infinitely variable.

in which said locking means comprise means to engage and lock the handle with said reference member.

in which said locking means are operable by rotation of the handle (e.g. 360 degrees, suitable for LH and RH persons).

in which said locking means are operable by rotation of the handle about an axis in said forwards and backwards direction.

in which said locking means comprise cam means rotatable about said axis by the handle.

in which said locking means comprise cam follower means adapted to engage and lock with said reference member.

having a unit comprising said reference member and said handle, a support member for the unit, and articulation means to enable the unit's attitude relative to the support member to be changed.

in which the articulation means are adapted to enable the unit's attitude to be changed to multiple positions.

in which the articulation means are adapted to enable the unit's attitude to be changed to infinitely variable positions.

in which the articulation means are adapted to enable the unit to fold flat against the support member.

in which the articulation means are adapted to enable the unit to fold flat in two opposite directions.

in which the articulation means comprise two interengaging cogged parts, each having a pivot, one said part for said unit and the other said part for said support member, and a tie tying the two pivots together.

comprising locking means to lock the unit at a chosen said attitude.

comprising locking means to lock the unit at a chosen said attitude by locking a said pivot.

in which the locking means comprise a friction part, and a lever and cam operable to engage together the tie and locking pivot by means of the friction part.

in which said handle is movable in a sideways direction relative to the reference member to produce electric signals suitable to vary the direction of motion of such apparatus for steering the same.

comprising damping means to control the sideways movement of the handle.

in which the handle has a middle position (e.g. a defined middle position) for steering straight ahead.

in which there are means (e.g. a notch and cooperating catch) to help an operator locate the handle in said middle position.

in which there are means to bias the handle towards said middle position (e.g. to act as a dead man's handle).

the speed-control means can be adapted to match the speed of the vehicle smoothly to the walking pace of an operator walking with said apparatus, and/or to use mechanical feedback from an operator walking with said apparatus to regulate the speed of the apparatus.

comprising inhibiting means to slow down or smooth out transmission of forces applied to the handle to change speed of the apparatus.

said inhibiting means comprise damping means.

the handle is mounted for linear said movement.

the handle is adapted to operate potentiometer means to provide said signal.

adapted for the motor to act as a brake under conditions in which the handle is operated to cause deceleration of said apparatus.

comprising a "dead man's handle" feature to halt the apparatus when the handle is released. This may operate, in the case of reversible motion, by bringing the handle to a neutral position between forward and reverse position ranges of its movement.

the handle has a sideways range of movement relative to the said, or another, reference member to control change of direction of movement of the apparatus.

comprising mechanical damping means. The damping means are sufficiently strong, or otherwise suitably arranged, to prevent hunting action of the movement of the apparatus.

the damping means comprise a mechanical damper.

the damper comprises a rotary damper.

adapted for said forwards and backwards movement of said handle to be rectilinear. A sliding handle can be made very robust, and more natural-feeling (i.e. give a more intuitive feeling to the controlling action.)

The handle is connected to the apparatus, rather than being located on a remote control, to enhance these advantages.

said means to convert position into a speed-control signal comprise a flat-strip potentiometer.

adapted to be retrofitted to an existing walk-with vehicle or other walk-with apparatus.

The apparatus may have any one or more of the following features:

adapted to use mechanical feedback from an operator walking with said apparatus to regulate the speed of the apparatus.

the handle has a zero position corresponding to zero speed.

the handle has a backwards range of movement in which it can move in a backwards direction to control increase in backwards speed of the apparatus and incrementally forwards to control reduction in the backwards speed.

the forward range, zero position and backwards range allow a smooth transition of the electric signal from a forward-controlling signal to a backward-controlling signal.

comprising an electric motor to produce forward, and possibly backwards, movement of said apparatus, and controlled by said electric signal to control said speed of this movement.

the motor is a DC motor.

comprising a motor controller for the motor which has an acceleration ramp to provide smooth acceleration.

the acceleration ramp is greater than 0.5 second.

the acceleration ramp is greater than 1 second.

adapted for the motor to act as a brake under conditions in which the handle is operated to cause deceleration of said apparatus.

comprising a "dead man's handle" feature to halt the apparatus when the handle is released.

the handle has a sideways range of movement to control change of direction of movement of the apparatus.

comprising mechanical damping means.

the damping means comprise a mechanical damper.

the damper comprises a rotary damper.

adapted for said forwards and backwards movement of said handle to be rectilinear.

adapted for said forwards movement of said handle to be parallel to the forwards direction of travel of said apparatus.

Embodiments of the invention can readily match the speed of the vehicle/apparatus to the walking pace of the operator, regardless of slope or quality of terrain.

The use of mechanical feedback from the operator to regulate the speed (as opposed to basic voltage control of speed) helps the intuitive feel/use of the control and smooths out the speed-controlling action.

Embodiments of the invention relate to battery-powered, hand-operated, electric vehicles such as an electric wheelbarrow or battery-powered golf trolley. They provide a push/pull handle assembly that controls steering and forward or reverse motion, as well as the speed in both directions.

Nearly all battery powered vehicles use a direct current motor controller to vary the speed of the motor. These in turn are controlled by varying the resistance on a potentiometer or variable resistor to adjust the effective speed of the motor. The potentiometer is usually set using a twist grip throttle, in the case of a vehicle like an electric wheelbarrow, or a simple thumbwheel or rotating knob as used on the majority of powered golf trolleys. In reality the majority of motor controllers regulate the average voltage to the DC motor rather than speed itself. This works reasonably well on level ground but fails to adjust for uneven terrain or slopes, resulting in uneven speed and constant readjustment of the throttle device.

Embodiments of the invention use mechanical feedback from the operator to regulate the direction and speed of the vehicle in an intuitive way. Push the handle to go forward and pull to go backwards, whilst side to side movement of the handle controls steering. Letting go of the handle will cut off power to the motor. The harder the operator pushes, the faster the vehicle will travel forward and pulling has the same effect in reverse. If the vehicle encounters an uphill slope it will tend to slow down, but if the operator continues to walk at the same pace, the resulting additional pressure on the handle will raise the voltage to the motor, bringing the speed back up to the operator's walking pace. Equally, on a downhill slope the vehicle will tend to run away from the operator causing the pressure on the handle to reduce and resulting in the vehicle slowing down again. On steeper downhill slopes, this tendency for the vehicle to run away would change the effective action from a pushing motion to a pulling motion, sending the motor into reverse to provide a braking effect on the vehicle.

All walk behind apparatus, powered by DC motors with variable speed control, use DC motor controllers to control speed. These DC motor controllers, (chopper circuits), switch the current on and off at very high frequency to give the effect of a reduced average voltage to control speed. DC motor controllers are, in turn, controlled by potentiometers or variable resistors to determine the average voltage/speed of the DC motor. Depending on the level of sophistication, these controllers will have adjustable or fixed acceleration and deceleration ramps. The acceleration/deceleration ramps will be fixed or adjusted to suit the application in hand. In the case of a golf cart this would normally be between 0 and 1, or possibly 1 and 2, seconds. Where very heavy loads are involved this might be longer to prevent overloading of the motor circuit.

DC powered walk behind apparatus will invariably have a control handle with a potentiometer or variable resistor attached. For those that do not have variable speed control, there will be a simple on off switch or a push button to control forward and reverse motion. Those that have variable speed control will have either a rotary knob or thumbwheel, or a twist grip type control or some variation thereof. The innovative part of my preferred embodiment may be considered as, that I have combined the control handle, (which usually controls direction), and the control of the potentiometer/variable resistor, into a single intuitive control handle. Unlike existing control handle assemblies, it is the movement of the handle itself that directly controls the potentiometer/variable resistor, which in turn governs the speed of the apparatus. My preferred embodiment differs from a joystick in that the motion is strictly linear as opposed to rotational and employs a physical damping element. At the smaller end of the scale, joysticks are designed for thumb/finger movement, whereas at the industrial end they are designed for a twisting wrist type of movement. It is theoretically possible to attach a handle to the top of a joystick, but the resultant motion would follow an arc and put significant torsional stresses onto the joystick's pivot point.

Implementing damping into the handle's movement, I am effectively introducing a degree of acceleration/deceleration control as well as providing for the absorption of vibration or erratic movements of the handle. By increasing the damping on the handle, we can shorten the acceleration/deceleration ramp on the motor controller and vice versa. In this way, through adjustment of physical damping, DC motor acceleration/deceleration ramp and spring pressure it is possible to optimise the performance characteristics of my device to suit different applications.

My specification provides for movement in both forward and reverse directions, which will have many applications in the industrial field. Embodiments can exemplify implementations in the forward or reverse directions independently.

I provide direct control of the potentiometer/variable resistor through the movement of the handle.

My original embodiment (FIG. 5) was not too dissimilar to a joystick except that there is a handle 1 on top and that the potentiometers are linear actuators (9 and 11) as opposed to rotary potentiometers located at the fulcrum point (35). Joysticks work well with, at the smaller end, finger movement, and at the larger end, wrist movement. It is possible to fit a handle 1 to the top of a joystick 2, but the movement in the forward and backwards direction tends to follow an arc rather than a straight linear movement. Additionally, the movement on a joystick is not generally damped, although, looking at my original design, it would be possible to add this feature. I moved away from my original design because of the problems associated with torsional forces when moving the handle from side to side. The forward and backward displacement of a joystick is limited by the length of the joystick itself. Larger displacements are possible with longer joysticks at the expense of additional torsional forces in all planes. These problems can be overcome through engineering to provide the required strength, but the resulting design is a lot less elegant and practical.

Acceleration and deceleration ramps are mentioned purely to demonstrate that the handle could be fine tuned for different applications by finding the optimum balance between electronic and mechanical (through damping) control of acceleration/deceleration. We can widen the range of the motor controller's acceleration/deceleration ramp to include 0 seconds upwards. Given sufficient mechanical damping, it is feasible, in some applications, to reduce the motor controller's acceleration/deceleration ramp to zero. Where the handle is to be retrofitted, we may have no control at all over the type of motor controller fitted, and will have to rely on selection of spring pressure and mechanical damping to achieve the best results. By testing the device in various permutations of applicable use, it is possible to determine optimum settings for the acceleration/deceleration ramps. It appears that for lighter loads a short acceleration ramp will make the handle more responsive, whilst heavy loads would benefit from a longer acceleration ramp. We can lengthen the effective acceleration ramp of a motor controller by introducing stiffer mechanical damping, but cannot shorten it unless the motor controller allows adjustment of the acceleration/deceleration ramps. This is not generally the case in low cost controllers such as those fitted to golf caddies, where the acceleration/deceleration ramps are fixed.

Some potential applications could be:
Electric wheelbarrows
Powered hand carts
Powered cart movers
Powered trailer dolleys
Hand pallet trucks
Powered golf trolleys
Industrial floor cleaners and sweepers
Camera dolleys
Some important features:
Electrical fine adjustment;

Single handle to control speed and direction in an intuitive manner: push if backed into corner; pull if going into brick wall; use motor/reversal to brake; controller with regenerative braking Smooth transition from forward to reverse and vice versa without resorting to any other controls Retrofit to existing vehicles Low manufacturing cost Dead man stop when handle is released Motor braking on steep downhill slopes Embodiments of the invention can readily match the speed of the vehicle/apparatus to the walking pace of the operator, regardless of slope or quality of terrain.

The use of mechanical feedback from the operator to regulate the speed (as opposed to basic voltage control of speed) helps the intuitive/feel use of the control and smooths out the speed-controlling action.

Spectrasymbol Softpot (trade names) technology for high reliability flat-strip potentiometer The acceleration/deceleration ramps and the damping can be easily fine-tuned to suit different applications.

Use of an ACE (trade name) rotary damper

Handle mechanically connected to apparatus.

Walk-with apparatus.

Electrical.

Simplified.

Damper, preferably rotary.

Retrofit.

DC motor.

Possible applications and particular features:

Lawnmower, golf caddy, thumb-wheel speed control, controls voltage.

Sliding handle speed control; forward and reverse; and direction.

Fall-safe devices: overload; deceleration sensor; letting go of handle produces halt (dead man's Handle); downhill or motor running away, motor acts in reverse as a brake.

Softpot™ (potentiometer).

A difference from a self-propelled wheelchair control handle is: in order for the apparatus to move smoothly with the walker, the control handle will need a degree of stiffness and perhaps robustness) in its movement, otherwise the movement of the apparatus will be unstable and jerky (responding to every little pressure on the handle).

The mechanical damper may be assisted by any other means having a function to smooth the results due to actuation of the handle.

Any suitable means may be used to provide robustness.

DETAILED DESCRIPTION RELATING TO THE DRAWINGS

Figure 4:
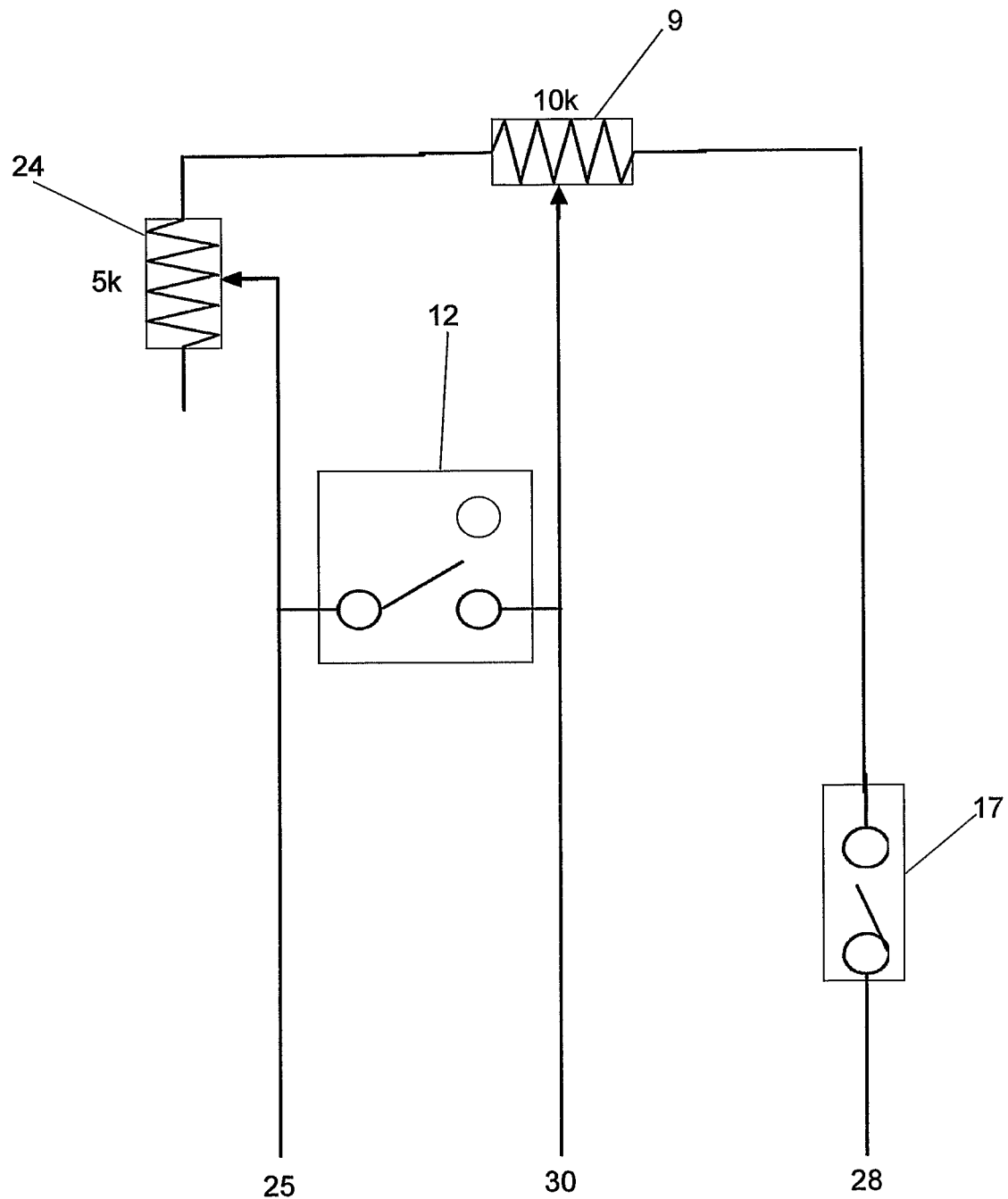
Figure 6:
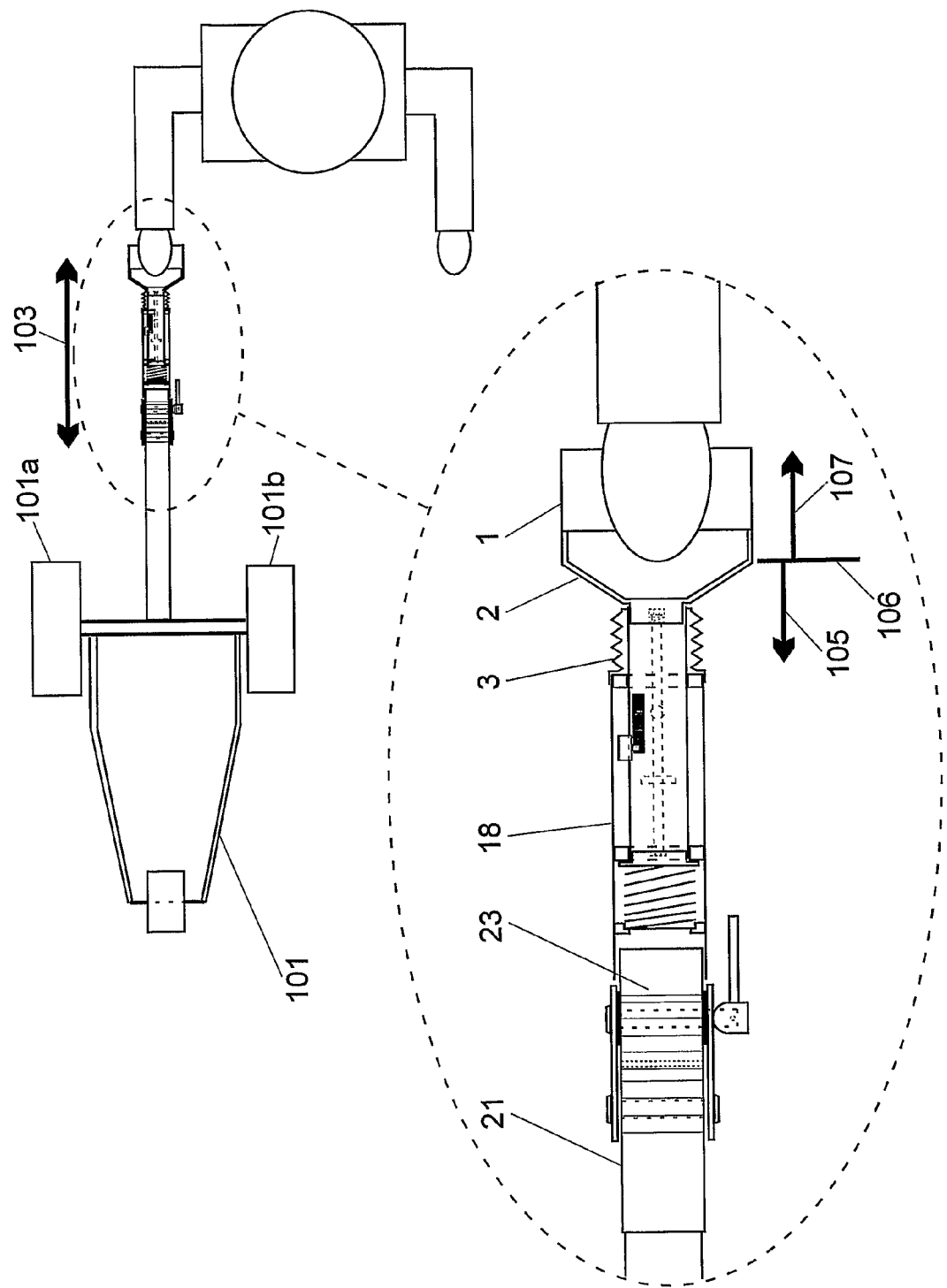
Figure 7:
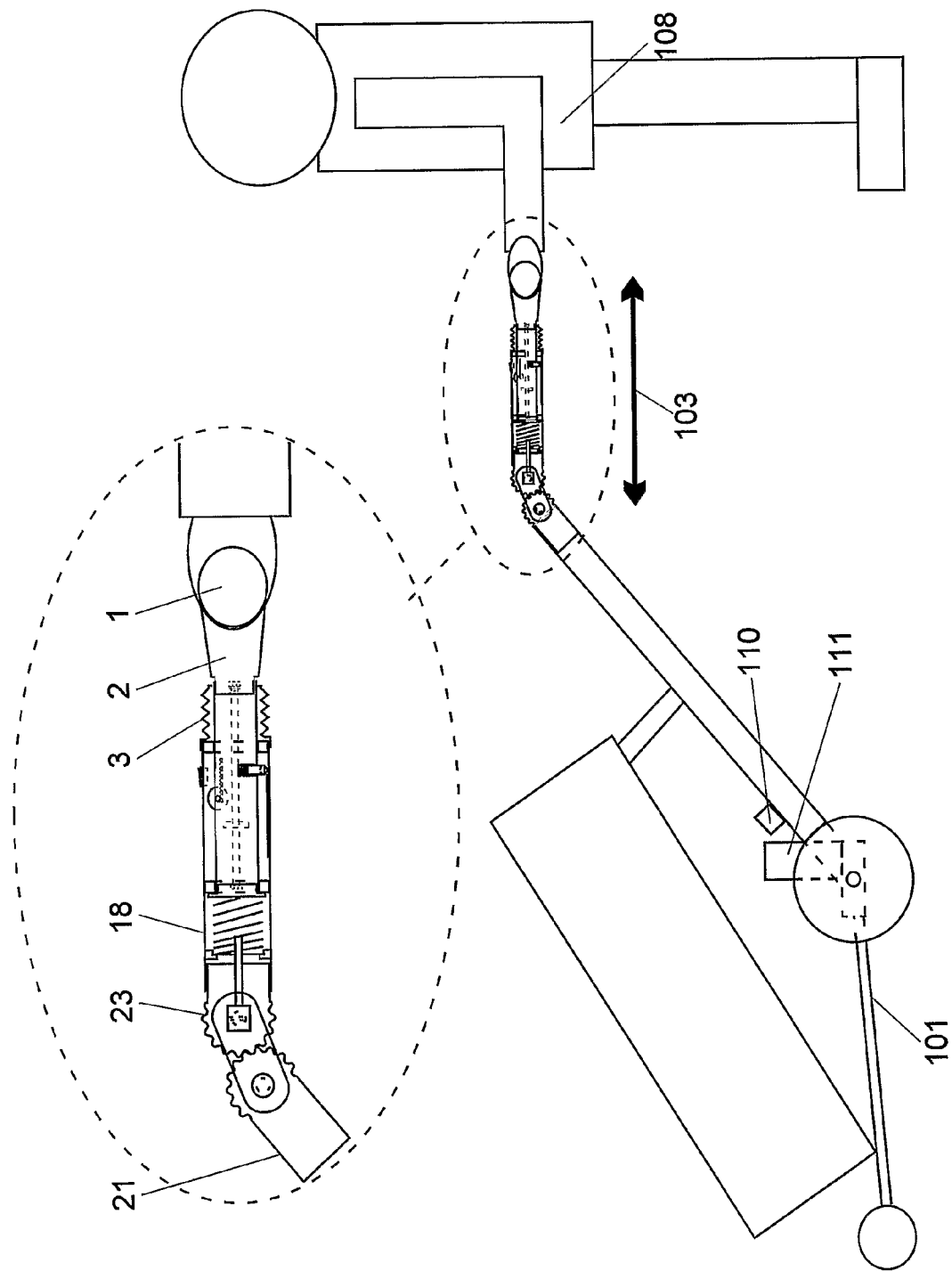
Figure 12:
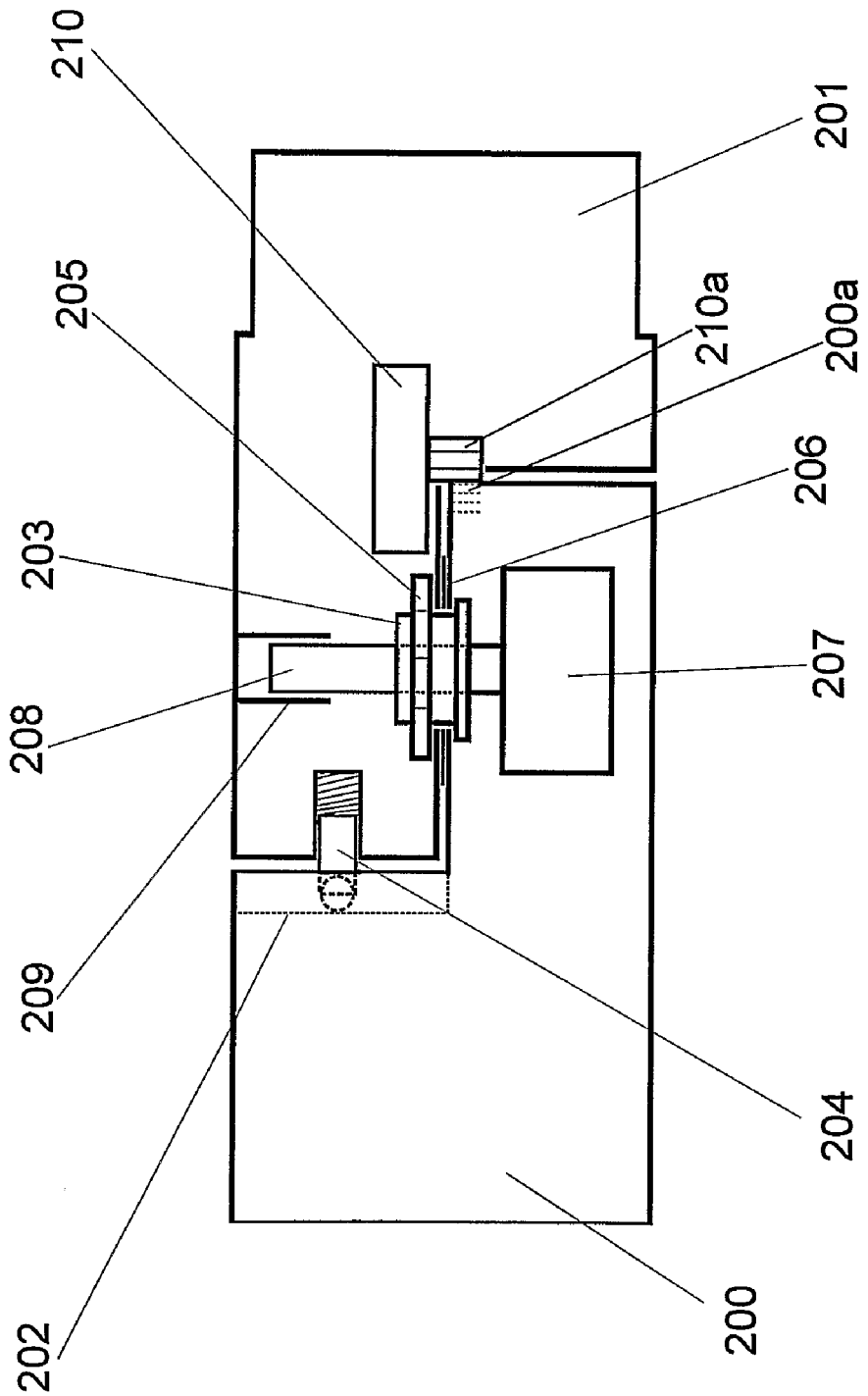

Reference will now be made by way of example to the accompanying drawings, which are schematic and part-sectional diagrams, in which:

FIG. 1 in schematic cutaway shows the handle assembly in side elevation (FIG. 1.1), plan view (FIG. 1.2) and cross-sections (FIG. 1.3 and FIG. 1.4, along the lines marked 1.3 and 1.4);

FIG. 2 shows a typical circuit diagram for the electronic components of the FIG. 1 embodiment;

FIGS. 3 and 4 correspond to FIGS. 1 and 2, and show alternative implementations, with speed control in the forward direction only, in side elevation (FIG. 3.1), plan view (FIG. 3.2) and cross-sections (FIG. 3.3 and FIG. 3.4, along the lines marked 3.3 and 3.4);

FIG. 5 in schematic cutaway side elevation shows an earlier implementation with a joystick, which is possible but not preferred;

FIGS. 6 and 7 are plan and side views, with an enlarged schematic cutaway detail, showing how the FIG. 1 or FIG. 3 embodiment is applied to a golf trolley/caddy 101;

FIGS. 8 and 9 are schematic vertical cross-sections, taken along the line 3.3 FIGS. 3.1 and 3.2, of the handle locking mechanism; FIGS. 8.1 and 8.2 show the locked and unlocked positions respectively; FIG. 8.3 shows the locking plunger 90 in enlarged detail; FIG. 9 shows the handle in its 8 possible rotated positions;

FIGS. 10 and 11 show the quick-release fold-flat adaptor of FIGS. 1 and 3, in side elevation (FIG. 10.1), in plan view (FIG. 10.2 in the locked position and FIG. 10.3 in the unlocked position) and in plan view (FIG. 11 locked in various positions); and FIGS. 12 and 13 show a side view (FIG. 12) and plan views (FIG. 13, in various positions) of the steering adaptor indicated in dotted lines in FIG. 3.1.

Referring to the drawings, like references refer to the same or like items in the various embodiments.

Referring more particularly to FIGS. 1 and 2, the outer structure of the handle assembly (all the parts shown in e.g. FIG. 1.1) consists of a two-piece outer casing 18 (comprising upper part 18a and lower part 18b) in rigid plastic (or other suitable material), which is attached to a fold flat adaptor body 23 made from a similar material. The adaptor body is attached to a second adaptor part 21 by way of connecting plates 84 and pivot pins 87. Adaptor part 21 can be custom manufactured to allow retrofitting of the handle to the operating arm of an existing vehicle design. The attachment angle between the adaptor body 23 and second adaptor part 21, can be adjusted to keep the handle horizontal, at the optimum angle for normal use, or folded flat for storage purposes.

The hollow piston 19 is connected to the yoke 2 and handle 1 at one end, (parts 1 and 2 are moulded as a single part), by the square rod 80, tensioning spring 82 and locknut 83. The flange plate 7 is connected at the other end via the square rod 80 and locknut 79. Made from rigid plastic, these four parts 19, 2, 1, 7 together with the square rod 80 and spring and locknuts 82, 79, 83 collectively make up the primary moving part of the handle assembly. The piston 19 slides backwards and forwards within the outer casing 18a, 18b, through two nylon sleeve bearings 4. Rubber bellows 3 are fitted at the handle end to prevent the ingress of water.

Movement is limited by flange plate 7 attached to the end of the piston 19 and the end stops 5. Additionally flange plate 7 and the end stops 5 act as spring retainers for return springs 8 and 6. The return springs 8 and 6 provide resistance to movement in the forward and reverse directions respectively and act to centre the piston and handle in the neutral position as shown in FIG. 1.1 and FIG. 1.2. Cross section FIG. 1.4 is taken through the handle 1 end of the outer casing 18, and shows a linear guide device 20 (comprising tooth 20a and notch 20b) between the nylon sleeve bearing 4 and piston 19, to prevent rotation of the piston 19 and handle 1 within the outer casing 18.

In order to prevent erratic movement of the piston/handle assembly, particularly over uneven terrain, a damping mechanism is used. A rack 13 is fixed to the side of the piston body 19 and engages with the pinion gear 14a on the rotary damper 14.

Motor controllers typically have an acceleration ramp to provide smooth acceleration. Introduction of the damper mechanism allows for smooth acceleration to be achieved through the damped movement of the handle while preventing hunting. Adjustment of the motor controller acceleration/deceleration ramp, together with different torque values for the rotary damper permits fine tuning of acceleration/deceleration and response to handle movements, to optimise the operation of the handle 1 for different applications.

The handle speed control means design utilises flat linear Softpot™ potentiometers, one for forward motion 9 and one for reverse 11. These use an external mechanical wiper 10 to activate them. These potentiometers are custom-manufactured by Spectrasymbol™, accessible at www.spectrasymbol.com. The external wiper assembly 10, see FIG. 3.3, is made up of a spring loaded plunger 10*b* (with spring 10*a*) with a roller 10*c* on the end, set into the body of the piston 19. Forward positioning of the piston activates the forward potentiometer 9 causing the resistance to rise steadily from zero in the neutral position to 10 k ohms at the maximum extent of forward travel. (Dependent upon the motor controller in use, this maximum could vary between 1 and 10 k ohms.) The higher the resistance, the faster the motor speed. Similarly, reverse positioning of the piston activates the reverse potentiometer 11. The maximum resistance value of the potentiometers 9 and 11 can be varied to suit the motor controller used. Values quoted are suitable for a 4QD Vortex controller available from 4QD, accessible at www.4qd.co.uk.

FIGS. 1.2 and 1.3 show a pair 16 of single-pole, double-throw, subminiature microswitches 16*a* and 16*b* operating in tandem. These are to detect reverse positioning of the piston assembly by way of a ramp 15 attached to the side of the piston 19. A further microswitch 12 is mounted above, and engages with, an indentation 12*a* on the piston 19, to detect when the handle 1 is in the neutral position.

FIG. 2 shows a wiring diagram for use with a 4QD Vortex motor controller. Wiring and component values may vary slightly from this depending on the characteristics of the controller used. Connections 25 to 30 represent the following connections on the Vortex controller
25=Speed control–(red wire)
26=Battery–ve–(green wire)
27=Ignition–(white wire)
28=Battery+ve–(yellow wire)
29=Reverse–(black wire)
30=Speed control wiper–(blue wire)

The On/Off switch 17 isolates the battery+'ve to prevent accidental movement of the vehicle.

Preset resistors 24*a* and 24*b* are optional but allow fine tuning to overcome the threshold resistance required by the controller to initiate movement. This allows the handle to be fine tuned to improve response and, H required, to set the startup speed of the vehicle. This in turn reduces the piston travel required to achieve maximum speed as the resistances for the preset resistors and the potentiometers are cumulative. The sensitivity of the handle can therefore be adjusted independently for both forward and reverse motion.

Forward and reverse potentiometers 9 and 11 are shown as 20 kΩ. As they are wired in parallel, the maximum effective resistance of either potentiometer is 10 kΩ.

The neutral detect microswitch 12 is closed when piston 19 is in the neutral position. This effectively shorts out the red and blue speed control wires 25 and 30, to prevent creep.

When the piston 19 is forward or reverse of the neutral position, the microswitch 12 is open circuit. In the forward position, the resistance across the red and blue speed control wires 25 and 30 is determined by the forward potentiometer 9, and the value of the resistance is governed by the position of the piston 19. In the reverse position, the microswitches 16*a* and 16*b* are activated. In this position, microswitch 16*b* feeds power to the black wire 29, switching the controller into reverse. Microswitch 16*a* isolates the blue wire from the forward potentiometer 9 and reconnects it to the reverse potentiometer 11. The resistance across the red and blue speed control wires 25 and 30 is now determined by the reverse potentiometer 11, and the value of the resistance is governed by the position of the piston 19.

FIG. 3 shows an alternative implementation, to control forward motion only, e.g. a battery-powered golf trolley. FIG. 4 shows the circuit diagram for this implementation using a 4QD Uni™ series controller available from 4QD™, www.4qd.co.uk.

Connections 25, 28, and 30 represent the following connections on the Uni™ series controller.
25=Speed control–(green wire)
28=Battery+ve–(red wire)
30=Speed control wiper–(blue wire)

The enlarged parts of FIGS. 6 and 7 correspond e.g. to FIG. 3.2 and 3.1 respectively and show handle positioning to control caddy speed, as described below.

HANDLE LOCKING MECHANISM. There are occasions when hands-free operation is desirable. I have therefore added a locking mechanism 80, 81, 90 to the handle assembly such that it can be locked in any position.

The locking mechanism is as intuitive and easy to use as the handle itself. Once the desired walking speed has been reached, twisting the handle by $\frac{1}{8}^{th}$ of a turn in either direction locks the handle in position. A further twist of $\frac{1}{8}^{th}$ of a turn in either direction unlocks it again. When used with one of the newer speed controllers with cruise control feedback, my handle assembly offers true cruise control capability with the ability exactly to match the speed of the trolley/vehicle to the operator's walking pace.

FIGS. 8.1 and 8.2 show cross-sections of the handle locking mechanism in the locked and unlocked positions respectively. FIG. 8.3 shows the locking plunger 90 in detail. FIG. 9 shows the handle in its eight possible rotated positions.

The square rod 80 which is linked to the handle and yoke assembly 1 and 2, is fitted with an offset octagonal cam 81. Two locking plungers 90 are held against the cam 80 by the external spring 93 with the hollow piston 19 acting as a spring retainer. In the unlocked position, there is clear space between the locking plungers 90 and the outer casing 18. When the handle is twisted through $\frac{1}{8}^{th}$ of a turn, the offset octagonal cam 81 forces the two plungers 90 outwards towards the casing 18 against the pressure of the outer springs 93. Once in contact with the outer case 18, the rubber caps 92 move linearly into the plunger casings 91 against the pressure of the inner springs 94. The frictional force of the rubber caps 92 against the outer casing 18 is sufficient to overcome the relatively weak pressure of the handle return springs 6 and 8; effectively locking the handle in position.

FOLD FLAT ADAPTOR. I have made this design of an adaptor (all the parts shown in FIGS. 10.1 to 10.3) that attaches the handle assembly to the trolley/vehicle 101.

Modern powered golf trolleys are increasingly designed to fold down into smaller and smaller spaces. Given that my handle assembly would probably add additional length to a trolley if retrofitted, I have designed the adaptor to fold flat against itself. I have also Incorporated a quick-release mechanism that allows infinite adjustment of the angle of the adaptor (FIG. 10.1, FIG. 10.2, FIG. 10.3, FIG. 11).

The two halves 21, 23 of the adaptor are joined together using a pair, one on each side, of metal joining plates 84 and pivot pins 87. The end of one of the pivot pins 87 is fitted with a cam 85 and handle 86. When the cam 85 is in the locked position (FIG. 10.2), the joining plates 84 are compressed against and around the adaptor body 23 and friction washers 88 to lock the adaptor at the desired angle. Releasing the locking handle 86 (FIG. 10.3), frees off the pressure against the adaptor body 23, thereby permitting rotational movement under the controlling restraint of interengaging cogged ends 21a, 23a. FIG. 11 shows the adaptor locked in various positions. The use of the plates 84 enables the adaptor to fold flat.

STEERING. FIG. 12 shows a side view of a steering adaptor mechanism 211 comprising all the parts shown in FIG. 12. This could be fitted between the fold flat adaptor part 23 and the main body parts 18a and 18b of the handle assembly.

The steering mechanism consists of an overlapping left hand section 200 and right hand section 201 joined together and pivoting through a threaded collar 203 and retaining nut 205. The two parts are separated by a low friction washer 206. A potentiometer 207 is fixed in place in section 200. The potentiometer has a shaft 208 that passes through the collar 203 and is pressed into a receptacle 209 moulded into section 201. FIG. 13 shows a top view of the steering mechanism 211. A spring-loaded plunger 204 acts as a cam follower 204 against the V-section cam 202 to centre the handle section 201 in the neutral (straight ahead) position 220, FIG. 13.2. Moving the handle 1 to the right 221, FIG. 13.1, or left 222, FIG. 13.3, alters the potentiometer setting to generate the signals 104 necessary to drive differentially the wheels 101a, 101b of the trolley. The spring plunger 204 and the V-section cam 202 are designed to co-operate such that there is a centering force on the handle section 201 to return it to the neutral position shown in FIG. 13.2. In order to limit too rapid steering movements and/or to absorb vibration over uneven terrain, a rotary damper 210 is fitted in section 201 with a toothed pinion 210a engaging a toothed outer edge 200a of section 200.

It will be seen that there has been provided:

Walk-with apparatus 101 in the form of caddy 101 having a reference member 18 and a handle 1 adapted to be used to hold and guide the apparatus 101, and damping means 13, 14, the handle 1 being movable in a forwards and backwards direction 103 relative to the reference member 18 to produce electric signals 104 on leads 25 to 30, FIG. 2, to vary the speed of the apparatus 101, under the effect of the damping means 13, 14, thereby to inhibit (i.e. reduce or prevent) hunting.

the handle 1 has a forward range of movement 105 in which it can move forwards to control increase in forward speed of the apparatus 101 and incrementally backwards to control reduction in the forward speed.

the handle 1 has a zero position 106 at which it is positioned (as seen in FIG. 1.1) corresponding to zero speed.

the handle has a backwards range of movement 107 in which it can move in a backwards direction to control increase in backwards speed of the apparatus 101 and incrementally forwards to control reduction in the backwards speed.

the forward range 105, zero position 106 and backwards range 107 allow a smooth transition of the electric signal 104 from a forward-controlling signal to a backward-controlling signal.

the apparatus 101 is adapted to match the speed of the apparatus 101 smoothly to the walking pace of an operator 108 walking with said apparatus 101.

the handle 1 is connected and arranged to transmit thrust to the reference member 18 without torque when moved in said forwards and backwards direction 103.

the handle 1 is adapted to have rectilinear movement in said direction 103.

the handle 1 is connected in-line with a possibly piston-like (i.e. stiff, massive and/or substantially cylindrical) reciprocable member 19 arranged to move within said reference member 18.

in which the handle 1 is adapted to have sideways movement to enable control of the direction of movement of said apparatus 101.

comprising inhibiting means 13, 14, 110, 111 to slow down or smooth out transmission of forces applied to the handle 1 to change speed of the apparatus 101.

said inhibiting means 13, 14 comprise damping means 13, 14.

said damping means 13, 14 comprise rotary damping means 13, 14, FIG. 1.1.

the damping means 13, 14 are connected between the handle 1 (via member 19 fixed to handle 1) and reference member 18.

the inhibiting means 110, 111 comprise a DC motor controller 110 adapted to provide an acceleration ramp for the motor 111.

the damping means 13, 14 and the acceleration ramp controller 110, 111 are capable of, or adapted for, adjustment in combination to enable the speed of travel of the apparatus 101 to be regulated to match the speed of an operator 108 walking with the apparatus 101 simply by the operator 108 holding the handle 1, smoothly and so as to inhibit hunting.

comprising linear position sensor means 9, 10, 11 to produce said signals 104 from movement of said handle 1.

comprising continuous position sensor means 9, 10, 11 to produce said signals 104 from movement of said handle 1.

comprising contactless position sensor means 9, 10, 11 to produce said signals 104 from movement of said handle 1.

comprising potentiometer means 9, 10, 11 to produce said signals 104 from movement of said handle 1.

the potentiometer means 9, 10, 11 comprise linear potentiometer means 9, 10, 11.

the potentiometer means 9, 10, 11 comprise indirect-pressure potentiometer means 9, 10, 11 as herein defined, i.e. an end-to-end coupled pair of indirect-pressure linear potentiometers 9, 11, e.g. each being potentiometer means 9 or 11 known under the trade name SOFTPOT. An indirect-pressure potentiometer is hereby defined as one comprising a layer of resistive material covered by a layer of slightly flexible conductive material with a separating layer between them that has a gap extending lengthwise such that a slidable pressure member (such as e.g. 10) can press the conductive layer into contact with the resistive layer at different points as it slides.

comprising speed-control means (all the parts shown in FIG. 1.1) for the apparatus 101 which comprise means (all the parts shown in FIG. 1.1) to produce said electric signals 104 from movements of said handle 1, the speed-control means (all the parts shown in FIG. 1.1) having been, or being adapted to be, retrofitted to the apparatus 101 by suitably designing adaptor 21.

comprising a DC motor 111 adapted to act as a brake under predetermined conditions relating to said electric signals 104.

comprising a dead man's handle mechanism comprising spring means 6, 7, 8 in conjunction with potentiometer means 9, 10, 11, i.e. that will operate to bring the apparatus 101 to a halt if the operator 108 releases the handle 1 (e.g. by the handle 1 being adapted by spring means 6, 7, 8 to return to a zero-speed position, e.g. using a braking effect of the motor 111).

comprising a vehicle 101.

said vehicle is a golf-caddy 101.

speed-control means (all the parts shown in FIG. 1.1) adapted to be used by a person 108 walking with walk-with apparatus 101 to vary the speed of the apparatus 101, the means (all the parts shown in FIG. 1.1) having a reference member 18 and a handle 1 adapted to be used to hold and guide the apparatus 101, the handle 1 being movable in a forwards and backwards direction 103 relative to the reference member 18 to produce electric signals 104 suitable to vary the speed of such apparatus 101.

comprising means 80, 81, 90 for locking the handle 1 in a chosen position (FIG. 8.1) in said forwards and backwards direction 103.

in which said position is infinitely variable.

in which said locking means 80, 81, 90 comprise means 80, 81, 90 to engage and lock the handle 1 with said reference member 18.

in which said locking means 80, 81, 90 are operable by rotation of the handle 1.

in which said locking means 80, 81, 90 are operable by rotation of the handle 1 about an axis in said forwards and backwards direction 103.

in which said locking means 80, 81, 90 comprise cam means 81 rotatable about said axis by the handle 1.

in which said locking means 80, 81, 90 comprise cam follower means 90 adapted to engage and lock with said reference member 18.

having a unit 1, 18, 23 comprising said reference member 18 and said handle 1, a support member 21 for the unit 1, 18, 23, and articulation means 21a, 23a, 84-88 to enable the unit's attitude relative to the support member 21 to be changed.

in which the articulation means 21a, 23a, 84-88 are adapted to enable the unit's attitude to be changed to multiple positions (see FIG. 11).

in which the articulation means 21a, 23a, 84-88 are adapted to enable the unit's attitude to be changed to infinitely variable positions.

in which the articulation means 21a, 23a, 84-88 are adapted to enable the unit 1, 18, 23 to fold flat against the support member (see FIG. 11.4).

in which the articulation means 21a, 23a, 8498 are adapted to enable the unit 1, 18, 23 to fold flat in two opposite directions (by virtue of cogged parts 21a, 23a extending more than half-way around the respective ends of parts 21, 23).

in which the articulation means 21a, 23a, 84-88 comprise two interengaging cogged parts 21a, 23a, each having a pivot 87, 87, one said part 23a for said unit 1, 18, 23 and the other said part 21a for said support member 21, and a tie 84, 84 tying the two pivots 87, 87 together.

comprising locking means 84, 85, 86, 87 to lock the unit 1, 18, 23 at a chosen said attitude.

comprising locking means to lock the unit 1, 18, 23 at a chosen said attitude by locking a said pivot 87.

in which the locking means 84, 85, 86, 87 comprise a friction part 88, 88, and a lever 86 and cam 85 operable to engage together the tie 84, 84 and locking pivot 87, 87 by means of the friction part 88, 88.

in which said handle 1 is movable in a sideways direction 221, 222 relative to the reference member 18 to produce electric signals 104 suitable to vary the direction of motion of the walk-with apparatus 101 for steering the same.

comprising damping means 200a, 210, 210a to control the sideways movement of the handle 1.

in which the handle 1 has a middle position 220 (e.g. a defined middle position) for steering straight ahead.

in which there are means 202, 204 (e.g. a notch 202 and cooperating catch 204) to help an operator 108 locate the handle 1 in said middle position 220.

in which there are spring means 204a to bias the handle 1 towards said middle position 220 (e.g. to act as a dead man's handle).

the speed-control means can be adapted to match the speed of the apparatus/vehicle 101 smoothly to the walking pace of an operator 108 walking with said apparatus 101, and/or to use mechanical feedback from an operator 108 walking with said apparatus 101 to regulate the speed of the apparatus 101.

comprising inhibiting means 6, 8, 13, 14 to slow down or smooth out transmission of forces applied to the handle 1 to change speed of the apparatus 101.

said inhibiting means 6, 8, 13, 14 comprise damping means 13, 14.

the spring means 6, 8 are connected between the handle 1 and reference member 18.

the handle 1 is mounted for linear said movement 103.

the handle 1 is adapted to operate potentiometer means 9, 10, 11 to provide said signal 104.

adapted for the motor 111 to act as a brake under conditions in which the handle 1 is operated to cause deceleration of said apparatus 101.

comprising a "dead man's handle" feature (spring means 6, 7, 8 in conjunction with potentiometer means 9, 10, 11) to halt the apparatus 101 when the handle 1 is released. This may operate, in the case of reversible motion, by bringing the handle 1 to a neutral position between forward and reverse position ranges of its movement 103.

the handle 1 has a sideways range of movement 221, 222 relative to the said, or another, reference member 18 to control change of direction of movement of the apparatus 101.

comprising mechanical damping means 13, 14. The damping means 13, 14 are sufficiently strong, or otherwise suitably arranged, to prevent hunting action of the movement of the apparatus 101.

the damping means 13, 14 comprise a mechanical damper 13, 14.

the damper 13, 14 comprises a rotary damper 13, 14.

adapted for said forwards and backwards movement 103 of said handle 1 to be rectilinear.

said means to convert position into a speed-control signal 104 comprise a flat-strip potentiometer 9, 11.

adapted to be retrofitted to an existing walk-with vehicle 101 or other walk-with apparatus 101.

adapted to use mechanical feedback from an operator 108 walking with said apparatus 101 to regulate the speed of the apparatus 101.

the handle 1 has a zero position (as shown in FIG. 1.1) corresponding to zero speed.

the handle 1 has a backwards range of movement in which it can move in a backwards direction to control increase in backwards speed of the apparatus and incrementally forwards to control reduction in the backwards speed.

the forward range, zero position and backwards range allow a smooth transition of the electric signal 104 from a forward-controlling signal 104 to a backward-controlling signal 104.

comprising an electric motor 111 to produce forward, and possibly backwards, movement of said apparatus 104, and controlled by said electric signal 104 to control said speed of this movement.

the motor 111 is a DC motor 111.

comprising a motor controller 110 for the motor 111 which has an acceleration ramp to provide smooth acceleration.

the acceleration ramp is greater than 0.5 second.

the acceleration ramp is greater than 1 second.

adapted for the motor 111 to act as a brake under conditions in which the handle 1 is operated to cause deceleration of said apparatus 104.

comprising a "dead man's handle" feature (spring means 6, 7, 8 in conjunction with potentiometer means 9, 10, 11) to halt the apparatus 101 when the handle 1 is released.

adapted for said forwards movement of said handle 1 to be parallel to the forwards direction of travel of said apparatus 101.

comprising wheels 101a, 101b operable differentially to steer the apparatus 101.

comprising electric motor means 111 connected to drive respective said wheels 101a, 101b differentially to steer the apparatus 101.

comprising feedback means 110 to sense the speed differential between said wheels 101a, 101b or means 111 driving them and control such driving means 111 to cause said speed differential to tend to zero when said handle 1 is in said middle position.

a method of adjusting apparatus or means 101, comprising a handle 1 and damping means 13, 14 and a DC motor 111 with an acceleration ramp, in which method the damping means 13, 14 and acceleration ramp are adjusted in combination to control how the speed responds to operation of the handle 1.

a method of operating apparatus or means 101, comprising a handle 1, in which the handle 1 is operated to control the speed of the apparatus 101 to match the speed of an operator 108 walking with the apparatus 101.

walk-with apparatus 101 having a reference member 18 and a handle 1 adapted to be used to hold and guide the apparatus 101 and movable in a sideways direction 221, 222 relative to the reference member 18 to produce electric signals 104 suitable to vary the direction of motion of such apparatus 11 for steering the same, and being movable in a different direction 103 relative to the reference member 18 to produce electric signals 104 suitable to vary the speed of such apparatus 101.

It will be apparent to one skilled in the art, that features of the different embodiments disclosed herein may be omitted, selected, combined or exchanged and the invention is considered to extend to any new and inventive combination thus formed. Where a preference or particularisation is stated, there is implied the possibility of its negative, i.e. a case in which that preference or particularisation is absent.

Many variations of the invention and embodiments hereinbefore described will be apparent to people skilled in the art and all such variations are to be considered as falling within the scope of the invention.

The invention claimed is:

1. A walk-with apparatus comprising:
a reference member,
a handle adapted to be used to hold and guide the apparatus, and
a damper, the handle being movable in a forwards and backwards direction relative to the reference member to produce electric signals to vary the speed of the apparatus, under the effect of the damper which is configured to selectively hold the position of the handle in at least one of a plurality of incremental positions and thereby selectively hold the speed of the apparatus thereby to inhibit hunting.

2. The apparatus as claimed in claim 1, in which the handle has a forward range of movement in which it can move forwards to control an increase in forward speed of the apparatus and incrementally backwards to control a reduction in the forward speed and wherein the damper is a viscous damper.

3. The apparatus as claimed in claim 2, in which the handle has a zero position corresponding to zero speed.

4. The apparatus as claimed in claim 3, in which the handle has a backwards range of movement in which it can move in a backwards direction to control an increase in backwards speed of the apparatus and incrementally forwards to control a reduction in the backwards speed.

5. The apparatus as claimed in claim 4, in which the forward range, zero position and backwards range allow a smooth transition of the electric signal from a forward-controlling signal to a backward controlling signal.

6. The apparatus as claimed in claim 1, in which the apparatus is adapted to match the speed of the apparatus smoothly to the walking pace of an operator walking with said apparatus.

7. The apparatus as claimed in claim 1, in which the handle is adapted to have sideways movement to enable control of the direction of movement of said apparatus.

8. The apparatus as claimed in claim 1, in which said damper comprises rotary damping means.

9. The apparatus as claimed in claim 1, comprising a DC motor controller adapted to provide an acceleration ramp for the motor.

10. The apparatus as claimed in claim 9, in which the damper and the acceleration ramp controller are adapted for adjustment in combination to enable the speed of travel of the apparatus to be regulated to match the speed of an operator walking with the apparatus simply by the operator holding the handle, smoothly and so as to inhibit hunting.

11. The apparatus as claimed in claim 1, comprising speed-control means for the apparatus which comprise means to produce said electric signals from movements of said handle, the speed-control means having been, or being adapted to be, retrofitted to the apparatus.

12. The apparatus as claimed in claim 1, which further comprises electrically operated and/or electrically controlled steering means to steer the apparatus.

13. The apparatus as claimed in claim 12, in which said handle is movable in a sideways direction relative to the reference member to produce electric signals suitable to vary the direction of motion of such apparatus for steering the same.

14. The apparatus as claimed in claim 13, further comprising damping means to control the sideways movement of the handle.

15. The apparatus as claimed in claim 1, further comprising wheels operable differentially to steer the apparatus.

16. The apparatus as in claim 1, wherein the damper is configured to prevent hunting.

17. A walk-with apparatus comprising:
a reference member;
a handle adapted to be used to hold and guide the apparatus; and
a damper, the handle being movable in a forwards and backwards direction relative to the reference member to produce electric signals to vary the speed of the apparatus, under the effect of the damper, wherein the damper is a viscous damper configured thereby to inhibit hunting.

18. The apparatus as claimed in claim 17, in which the handle is adapted to have sideways movement to enable control of the direction of movement of said apparatus.

19. The apparatus as claimed in claim 17, in which the damper and the acceleration ramp controller are adapted for adjustment in combination to enable the speed of travel of the apparatus to be regulated to match the speed of an operator walking with the apparatus simply by the operator holding the handle, smoothly and so as to inhibit hunting.

20. The apparatus as claimed in claim 17, in which said handle is movable in a sideways direction relative to the reference member to produce electric signals suitable to vary the direction of motion of such apparatus for steering the same.

21. The apparatus as claimed in claim 17, wherein said damper is a sideways damper which is configured to control the sideways movement of the handle.

22. The apparatus as in claim 1, wherein the damper is configured to reduce hunting.

* * * * *